(12) United States Patent
Lozhkin

(10) Patent No.: US 7,505,524 B2
(45) Date of Patent: Mar. 17, 2009

(54) RECEIVER DEVICE AND COMMUNICATION SYSTEM

(75) Inventor: Alexander Lozhkin, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 759 days.

(21) Appl. No.: 11/044,273

(22) Filed: Jan. 28, 2005

(65) Prior Publication Data

US 2006/0056551 A1   Mar. 16, 2006

(30) Foreign Application Priority Data

Sep. 13, 2004   (JP) ............................. 2004-265071

(51) Int. Cl.
*H04L 5/12* (2006.01)

(52) U.S. Cl. .................... 375/261; 375/260; 375/262; 375/264

(58) Field of Classification Search ......... 375/260–262, 375/264, 265, 349, 348; 714/794, 795
See application file for complete search history.

(56) References Cited

U.S. PATENT DOCUMENTS 6,381,727 B1 *  4/2002  Ikeda ......................... 714/780
7,151,808 B2 * 12/2006  Fujii et al. ................. 375/347
2003/0099306 A1 *  5/2003  Nilsson et al. ............. 375/316

FOREIGN PATENT DOCUMENTS

| JP | 11-154926 A | 6/1999 |
|---|---|---|
| JP | 2001-308820 A | 11/2001 |
| WO | WO 2004/023684 A1 | 3/2004 |

* cited by examiner

*Primary Examiner*—David C. Payne
*Assistant Examiner*—Rahel Guarino
(74) *Attorney, Agent, or Firm*—Hanify & King, P.C.

(57) ABSTRACT

A communication system that sends and receives signals via each of two adjacent channels ch1 and ch2 in which inter-channel interference exists, wherein the receiver device comprises a soft decision target value generation unit for each of a plurality of received bits inputted from the corresponding channel; and a soft decision unit that makes a soft decision with respect to each of the plurality of received bits by using the respective soft decision target values. Each soft decision target value generation unit generates its own soft decision target values by using the respective soft decision target values of the plurality of bits inputted from the receiver device of the other channel and the soft decision unit makes a decision with respect to the received bits on the basis of the soft decision target values.

12 Claims, 11 Drawing Sheets

FIG. 6

|  | Q(q₁, q₂) |  |  |
|---|---|---|---|

$$\begin{array}{cccc}
1011 & 1001 & 0001 & 0011 \\
\blacklozenge & \blacklozenge & 3\alpha\ \blacklozenge & \blacklozenge \\
\\
1010 & 1000 & 0000 & 0010 \\
\blacklozenge & \blacklozenge & \alpha\ \blacklozenge & \blacklozenge \\
-3\alpha & -\alpha & \alpha & 3\alpha \\
\\
1110 & 1100 & 0100 & 0110 \\
\blacklozenge & \blacklozenge\ -\alpha & \blacklozenge & \blacklozenge \\
\\
1111 & 1101 & 0101 & 0111 \\
\blacklozenge & \blacklozenge\ -3\alpha & \blacklozenge & \blacklozenge \\
\end{array}$$

I(i₁, i₂)

US 7,505,524 B2

RECEIVER DEVICE AND COMMUNICATION SYSTEM

BACKGROUND OF THE INVENTION

The present invention relates to a receiver device and communication system and, more particularly, to a receiver device and communication system that utilize interchannel interference in a communication system that comprises two or more channels or subchannels, that is, a single-carrier communication system comprising two orthogonal channels, a multicarrier communication system with filterbank modulation, DMT (Discrete Multi-Tone) modulation, FMT (Filtered Multi-Tone) modulation, or the like, or an OFDM or OFDM-CDMA multicarrier modulation communication system in which bandwidth is divided into a multiplicity of independent narrow subbands each of which is independently modulated. Further, when 'channel' appears hereinafter, same is intended to include such subchannels.

The bit error rate (BER) of a single carrier communication system comprising two orthogonal channels, or a multicarrier communication system or multicarrier modulation communication system permits additional improvement by utilizing a received signal that includes distortion arising from Inter Channel Interference (ICI). Inter Channel Interference is produced as a result of an unavoidable environment subject to orthogonal loss between channels that arises due to a system malfunction of the communication system or a time-varying channel. The Inter Channel Interference arises from the leakage of spectral energy or what is known as 'interchannel crosstalk'.

The main advantage of the turbo receiver of the present invention is that the behavior of the ICI is treated as a probability variable of a Gaussian distribution with a zero mean value (a Gaussian approximation that is used in D. Froney. Jr, and M. V. Eyuboglu, "Combined Equalization and Coding Using Precoding", IEEE Commun. Magazine, pp. 25-34, Dec. 1991, for example) and for which a finite-state discrete Markov process model is adopted. With this ICI model, a simple Gaussian approximation may be considered to be more realistic from the perspective the ICI quality. The turbo receiver of the present invention is based on a maximum posterior probability estimation algorithm. This turbo receiver is such that information that is derived from a first channel following nonlinear processing is used to examine the estimated maximum posterior probability and, similarly, information that is derived from the second channel is used to examine the estimated maximum probability of the first channel.

(a) Multicarrier Communication System

In a multicarrier communication system with filterbank modulation, DMT (Discrete Multi-Tone) modulation, FMT (Filtered Multi-Tone) modulation, or the like, that is, a multicarrier communication system that divides bandwidth into a plurality of subbands that are independent bandwidths and performs modulation according to transmission data for each subband independently, the selection of the filter set has traditionally been executed with the constraint that the Inter Symbol Interference (ISI) and Inter Channel Interference (ICI) be completely removed.

In the case of a virtual transmission channel with which there is no Doppler shift and no frequency offset between transmitter and receiver, that is, which does not induce signal distortion, this constraint guarantees error-free recovery of a transmission symbol by the receiver. However, a frequency offset that is produced in each channel as a result of inaccurate tuning of the oscillator or due to a Doppler shift brings about BER distortion due to spectral leakage or ICI.

The sole method of alleviating such BER deterioration is that of making the frequency offset as small as possible, more specifically, keeping same within 1% of the subcarrier frequency interval. However, this method necessitates an exact frequency offset estimation and there is the problem that, when a multicarrier signal mixed with noise is received and the noise level is large, the accuracy of the frequency offset estimation is impaired. In addition, this method does not work properly in the case of a high-speed phasing channel, that is, in the case of a high-speed phasing channel for which the Doppler shift is fixed with respect to the transmission symbol and varies with time.

As shown in FIG. 1, if the frequency offset (the frequency offset normalized according to the channel interval) a is zero (a=0), the transmission function of the first subchannel (gain/frequency characteristic) produces infinite decay at the center frequency $f_2$ of the second subchannel (dotted line), as shown by the solid line in FIG. 1. Further, the transmission function of the second subchannel likewise produces infinite decay at the center frequency $f_1$ of the first subchannel. That is, if the frequency offset a is zero, ICI is not produced between adjacent subchannels. In other words, if the frequency offset a is zero, the subchannels are orthogonal and the ICI does not exist at all. FIG. 2 shows the subchannel characteristic when the frequency offset a ($\neq 0$) exists in a DMT system. If the frequency offset a is not zero, each spectrum of the adjacent subchannel exhibits a non-zero reciprocal gain at the subchannel frequencies $f_1$ and $f_2$ of interest, which are specified as $a_{21}$ and $a_{12}$ in FIG. 2. That is, as shown in FIG. 2, when the frequency offset is not zero, ICI (crosstalk) is produced between subchannels.

(b) Single Carrier Communication System

With single-carrier modulation methods that are extensively used at present, the receiver must incorporate a Quadrature down converter (quadrature decoder). This must subject the RF signal or local oscillator output to a 90° phase shift. The phase shift of the RF signal is generally accompanied by a trade-off with a noise output gain and the phase shift of the RF signal is problematic in the case of a wide band signal of a high-speed data system. Hence, the phases of the I and Q signals (see FIG. 3) are desirably shifted. So too when there is an error in the 90° phase shift or mismatch of the Q quadrature signal amplitudes, the constellation of the signal that has been frequency down-converted (quadrature-decoded signal) is degraded, whereby the BER is increased. FIG. 3 represents an ideal case where the I and Q signal amplitudes are equal and the phases of the I and Q signals are orthogonal and FIG. 4 represents a case (phase error case) where the I and Q signal amplitudes are not equal or the phases of the I and Q signals are not orthogonal. In FIG. 4, because the phases of the I and Q signals (I', Q') are not orthogonal or the amplitudes thereof are not equal, an ICI Quadrature component is produced as indicated by the bold lines Iq and Qi.

The action of keeping the phase shift offset at 4 to 7° in order to retain the same quality as when there is no phase offset and the phase shift between the RF signals or I, Q signals is 90° was established through experimentation. As detailed earlier, conventional communication systems are faced by the problem that ICI occurs due to a frequency offset, phase error, or amplitude error, or the like, and the BER degrades as a result of this ICI.

(c) A General System Model

FIG. 5 is a multicarrier system in which the frequency offset shown in FIG. 2 exists or is a model of 2-channel ICI in a single-carrier system in which the orthogonal mismatch shown in FIG. 4 exists. 1 and 2 are transmitter devices of first and second subchannels ch.1 and ch.2 respectively; 3 and 4 are receiver devices of subchannels ch.1 and ch.2 respectively; 5 and 6 are the transmission channels of each subchannel; 7 and 8 are multipliers that multiply, for each of channel signals $S_{17}^*(t)$, $S_{27}^*(t)$, the crosstalk coefficients $\alpha_{12}$, $\alpha_{21}$; 9 and 10 are synthesizers that synthesize the crosstalk (ICI) from the other subchannels with the channel signal of the respective synthesizers' own channel; and 11 and 12 are noise synthesizers. As can be seen from FIG. 5, the first subchannel signal leaks to the second subchannel according to the coupling coefficient $\alpha_{12}$ and the second subchannel signal leaks to the first subchannel according to the coupling coefficient $\alpha_{21}$. As a result of the intersubchannel frequency orthogonal, the noise components, which are expressed as $n_1(t)$ and $n_2(t)$ are statistically independent (no correlation).

Assuming a case where binary information is transmitted via the first and second subchannels by means of multiple value modulation method 16 QAM with a symbol cycle T, each point of the 16 QAM constellation in FIG. 6 is expressed by a 4-bit symbol made up of common mode components $i_1$, $i_2$, and quadrature components $q_1$, $q_2$. Further, the four bits are interleaved for the sequence $i_1q_1i_2q_2$. The Quadrature components I and Q are each graycoded through allocation of the bits 01, 00, 10, and 11, which correspond to the levels 3d, d, −d, and −3d respectively.

The model in FIG. 5 is advantageous from the point of view of understanding the physical process that is the cause of ICI. If this model is used, the task is to be able to determine accurately the values of the received signals, the transmission information symbols, and so forth of each subchannel even when ICI is produced.

One possible method of alleviating ICI in a receiver device adopts the decision feedback equalizer (DFE) for ICI cancellation that is proposed by G. Cherubini, E. Eiefheriou, S. Olcer, and J. M. Cioffi, "Filter bank modulation techniques for very high speed digital subscriber line", IEEE Commun. Magazine, vol. 38, pp. 98-104, May 2000.

Further, when the individual receiver device outputs are subject to a hard bit decision (hard decision) mode, there is barely any advantage in sharing information between the subchannels. The soft decision restricts the operational scope of the DFE according to the high SN ratio.

Even when the above approach is effective in a great number of real cases, minimizing the effects of ICI is essentially a quasi-optimum value. This is because, information on the transmission symbol is contained in the interference wave. The reliability of data transmission can be raised by means of optimal reception of a signal that is based on maximum posterior probability estimation.

An OFDM receiver that corrects errors in the phases and frequency of digital multiple carrier wave signals has been proposed as a first conventional technology (JP11-154926A). With this first conventional technology, in addition to demodulation FFT processing, the OFDM receiver performs FFT processing to evaluate its own noise component and prevents crosstalk (ICI) by performing correction processing so that the orthogonal remains between the carrier waves prior to the demodulation FFT processing on the basis of the evaluated own noise component.

Further, an OFDM receiver device that removes an intercarrier interference component that exists in the Fourier Transform output has been proposed as a second conventional technology (JP 2001-308820A). According to this second conventional technology, a filter coefficient is sequentially calculated by means of an adaptive algorithm to remove the carrier interference component from a frequency domain signal that constitutes the Fourier Transform output of the OFDM receiver and is established for an adaptive filter that is provided on the Fourier-Transform output side.

Moreover, the present inventors have proposed a receiver device that receives on each of two adjacent channels and closely examines the estimated probability of information on the second channel by means of the estimated probability of information on the first channel and, similarly, closely examines the estimated probability of information on the first channel by means of the estimated probability of information on the second channel (see WO 2004/023684). In this receiver device, the receiver portion that is provided on each channel calculates the difference between the probability that data received from the corresponding channel will be "0" and the probability that the data will be "1" as a soft decision target value in consideration of the degree of coupling between channels and adjusts and outputs its own soft decision target value by using the soft decision target value of the second channel that is inputted from the other receiver portion, whereby the "0" and "1" of the received data is judged on the basis of the adjusted soft decision target value.

However, the first and second conventional technologies do not demodulate the received signal so that the BER performance improves by using transmission symbol information that is contained in the ICI signal from the second channel.

Although the principle of the receiver device of the third convention technology is useful, the corresponding one bit of the adjacent subchannel is demodulated by using ICI but a plurality of bits are not demodulated by using ICI as one unit. For this reason, in communications in which a plurality of bits are taken as a single unit as per multi-value QAM modulation, there is the problem that reception and demodulation that uses information of a plurality of bits of the second channel is impossible.

SUMMARY OF THE INVENTION

An object of the present invention is to propose an optimal reception method and receiver device for a multi-value QAM signal that are based on maximum posterior probability estimation and to raise the reliability of multi-value QAM data transmission.

A further object of the present invention is to enhance the BER performance of the receiver device by using information of a plurality of bits of the second channel to demodulate a plurality of bits of its own channel.

A further object of the present invention is to reduce BER by using information of a plurality of bits of the multi-value QAM modulation of the second channel to demodulate multi-value QAM modulation data of its own channel.

The above objects are achieved by implementing a turbo algorithm and nonlinear signal processing. Hence, according to the present invention, after nonlinear processing, information of a plurality of bits that is derived from the first channel is used to examine closely the estimated posterior probability (soft decision target value) of the second channel-and, likewise, after nonlinear processing, information of a plurality of bits that is derived from the second channel is used to examine closely the estimated posterior probability (soft decision target value) of the first channel.

The present invention is a single-carrier or multicarrier communication system having two channels that comprises two multi-value QAM modulation transmitter devices that transmit data independently via each channel, a first crosstalk path with a coefficient $a_{12}$ for coupling from the first channel to the second channel, a second crosstalk path with a coupling coefficient $a_{21}$ for coupling from the second channel to the first channel, and two receivers for each channel. Preferably, the receivers of the in-phase component I and the Quadrature component Q are analogous and each comprise two parts, wherein the first part receives a first number-one bit and the second part receives a second number-two bit.

The communication system of the present invention comprises two transmitter devices that transmit data of one unit independently in a plurality of bits via two adjacent channels; two receiver devices provided in each channel that generates a soft decision target value for each of a plurality of received bits of one unit inputted from the corresponding channel and makes a soft decision with respect to the plurality of received bits by using the respective soft decision target values; and means for inputting the soft decision target values of the plurality of received bits of the first receiver device of one channel to the second receiver device of the other channel, wherein the second receiver device adjusts its own soft decision target values by using the respective soft decision target values inputted by the first receiver and makes a decision with respect to the received bits on the basis of the soft decision target values.

In a case where data of one unit is two-bit data of an in-phase component or a quadrature component that has been obtained by multi-value QAM modulation, the first channel/first bit receiver portion of the receiver device comprises (1) two first and second correlation means that integrate the multiplication results obtained by multiplying an input signal by predetermined reference signals; (2) three first to third nonlinear units having a transmission function of an amplitude limiter comprising a linear region; (3) a multiplication unit that multiplies the outputs of the nonlinear units by weighting functions; (4) a synthesizer that generates a soft decision target value of the first bit of the first channel by synthesizing each weighted multiplication unit output and the output of the first correlation means; (5) an adder circuit that adds the soft decision target values of the first and second bits of the second channel to the output signals from the first and second correlation means respectively and then inputs the addition results to the first and second nonlinear units respectively; and (6) an adder circuit that adds the soft decision target value of the second bit of the first channel to the output signal from the second-correlation means and inputs the addition result to the third nonlinear unit.

Further, in cases where data of one unit is two-bit data of an in-phase component or quadrature component that has been obtained by multi-value QAM modulation, the first channel/second bit receiver portion of the receiver device of the present invention comprises (1) three first, second and third correlation means that integrate the multiplication results obtained by multiplying an input signal by predetermined reference signals; (2) three first to third nonlinear units having a transmission function of an amplitude limiter comprising a linear region; (3) an adder circuit that adds the soft decision target values of the second and first bits of the second channel respectively to the output signals from the second and third correlation means and then inputs the addition results to the first and second nonlinear units respectively; (4) a calculation unit that multiplies the output signal from the first correlation means by a predetermined value and then adds the multiplication result to the outputs of the first and second nonlinear units; (5) an adder circuit that adds the soft decision target value of the first bit of the first channel to the output of the calculation unit and then inputs the addition result to the third nonlinear unit, wherein the soft decision target value of the second bit of the first channel is produced on the basis of the output of the third nonlinear unit.

The present invention proposes an optimal reception method and receiver device for a multi-value QAM signal based on maximum posterior probability estimation, whereby the reliability of the multi-value QAM data transmission can be increased.

Further, according to the present invention, the BER performance of the receiver device can be enhanced by using information of a plurality of bits of the second channel to demodulate a plurality of bits of its own channel.

In addition, according to the present invention, the BER can be reduced by using information of a plurality of bits of the multi-value QAM modulation of the second channel to demodulate the multi-value QAM modulation data of its own channel.

Other features and advantages of the present invention will be apparent from the following description taken in conjunction with the accompanying drawings.

BRIEF DESCRIPTION OF THE DRAWINGS

FIG. 6 is an explanatory diagram of a 16 QAM constellation;

DESCRIPTION OF THE PREFERRED EMBODIMENTS

The present invention is a communication system that sends and receives signals via two adjacent channels in which interchannel interference exists, wherein the receiver device comprises a soft decision target value generation unit that generates soft decision target values for each of a plurality of received bits inputted from the corresponding channel; and a soft decision unit that makes a soft decision with respect to each of the plurality of received bits by using the respective soft decision target values. Each soft decision target value generation unit generates its own soft decision target value by using each soft decision target value of the plurality of bits inputted by the receiver device of the other channel and the soft decision unit judges the received bits on the basis of the soft decision target values.

Figure 1:
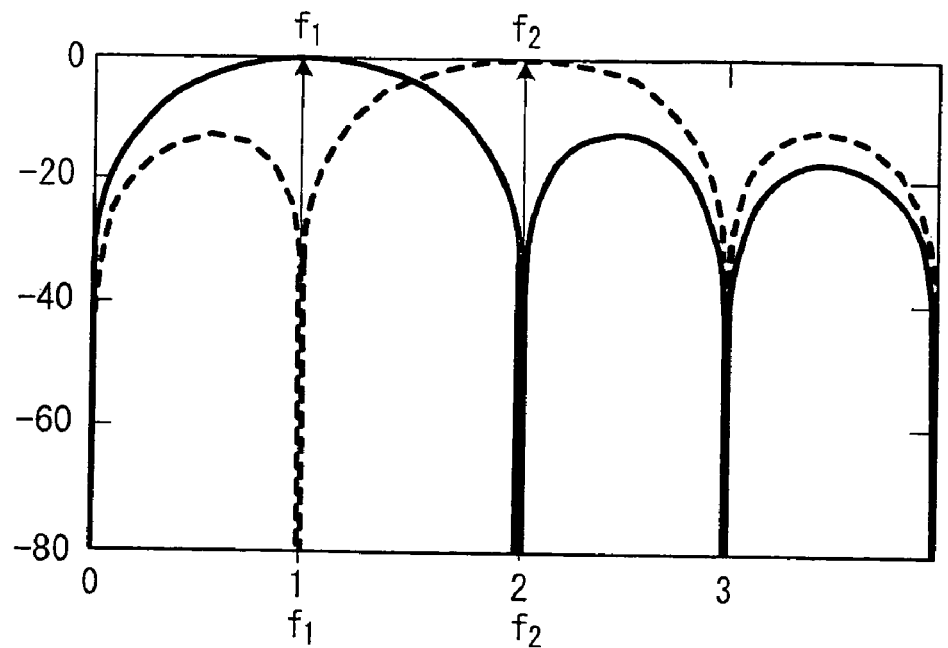
FIG. 1 is a frequency characteristic when the frequency offset a is zero.
Figure 2:
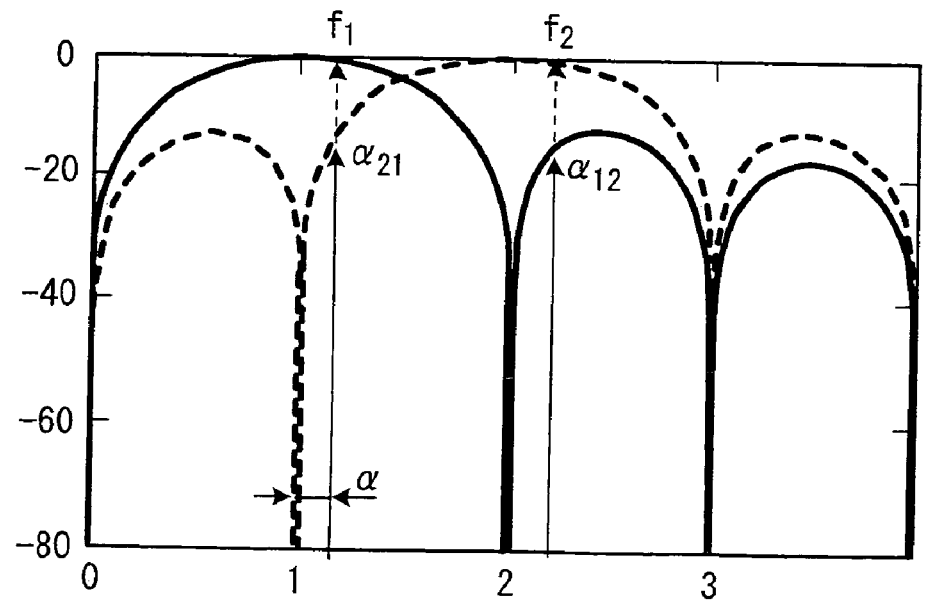
FIG. 2 is a frequency characteristic when the frequency offset a is zero.
Figure 3:
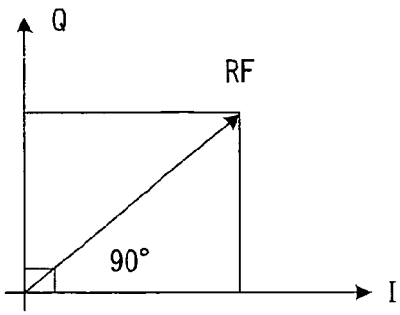
FIG. 3 is an explanatory diagram of a signal vector (constellation) in an ideal case where the signal amplitudes of demodulated signals I and Q are equal and the phases of signals I and Q are orthogonal.
Figure 4:
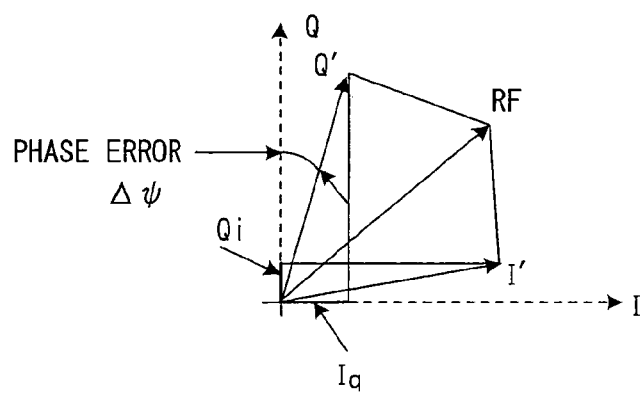
FIG. 4 is an explanatory diagram of a signal vector (constellation) in a case where the amplitudes of signals I and Q are not equal or the phases of signals I and Q are not orthogonal.
Figure 5:
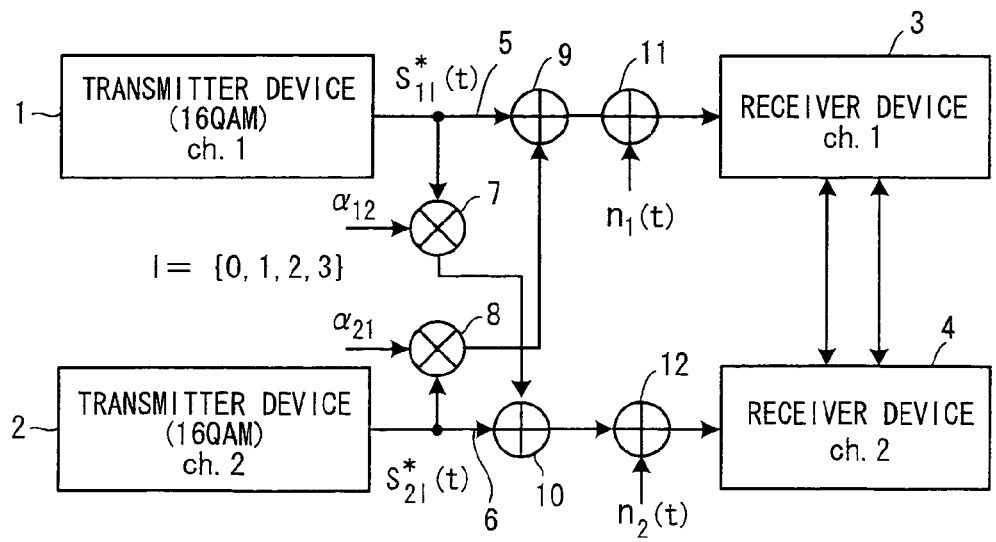
FIG. 5 is a general model serving to illustrate a multicarrier communication system or single-carrier communication system in which ICI exists.
Figure 7:
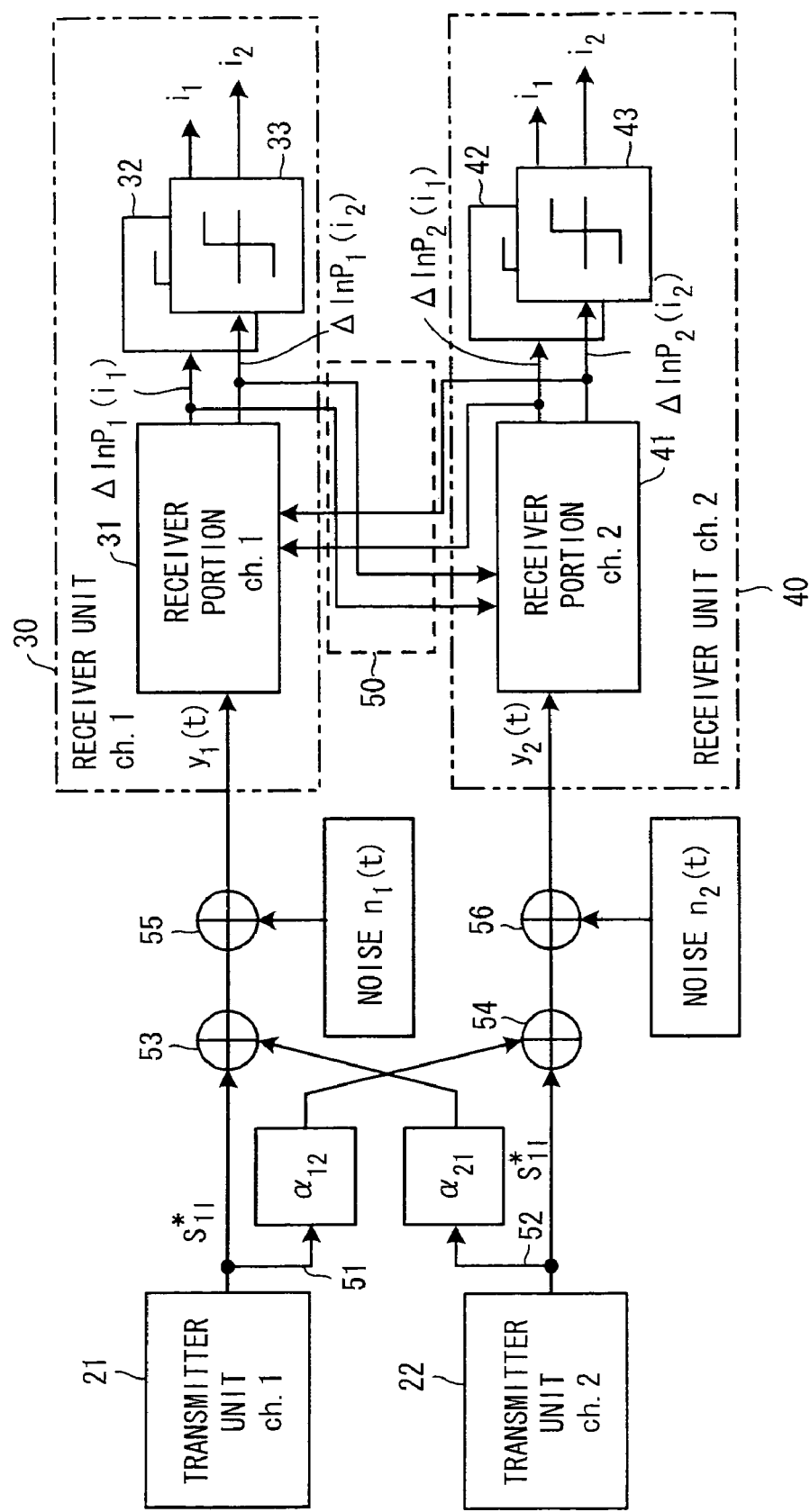
FIG. 7 shows the overall constitution of the communication system of the present invention that decodes received data by using interference between two adjacent channels.

(A) The Overall Constitution of the Communication System of the Present Invention FIG. 7 shows the overall constitution of the communication system of the present invention that decodes received data by using interference between two adjacent subchannels. The communication system comprises two transmitter units 21 and 22, which transmit data independently via adjacent subchannels ch1 and ch2, two receiver units 30 and 40, which are provided in each subchannel, receive data from the corresponding subchannel, and make a soft decision with respect to the received data, and means 50 for inputting the soft decision target values of each receiver unit to the other receiver unit. The receiver units 30 and 40 comprise receiver portions 31 and 41 respectively and first and second decision units 32, 33 and 42, 43 respectively.

The first receiver unit 30 (40) uses the soft decision target value that is inputted by the second receiver unit 40 (30) to adjust its own soft decision target value and judges whether the code of the received data is "+" or "−", that is, "0" or "1" on the basis of the soft decision target value. Further, as transmission path characteristics, a first crosstalk path 51, which has a coefficient $a_{12}$ for coupling from the first subchannel ch1 to the second subchannel ch2 and a second crosstalk path, which has the coefficient $a_{21}$ for coupling from the second subchannel ch2 to the first subchannel ch1 exist, these first and second subchannels being expressed by the numerals 51 and 52 respectively. Further, the ICI signal and noise are synthesized during transmission and the parts performing this synthesis are expressed by the numerals 53, 55 and 54, 56 respectively.

(B) Reception Symbol Demodulation Algorithm

The receiver units of the first and second subchannels of the communication system shown in FIG. 7 will now be described with respect to the algorithm for demodulating the reception symbols.

Assuming a case where binary information is transmitted by the transmitter units 21 and 22 via the first and second channels by means of a symbol cycle T and the multi-value modulation method 16 QAM, in the 16 QAM constellation of FIG. 6, each point is expressed by a 4-bit symbol made up of common mode components $i_1$ and $i_2$ and Quadrature components $q_1$ and $q_2$. Further, the four bits are interleaved for the sequence $i_1q_1i_2q_2$. The Quadrature components I and Q are graycoded through allocation of the bits 01, 00, 10, and 11, which correspond to the levels 3d, d, −d, and −3d.

According to the mapping in FIG. 6, the Hamming distance between two adjacent constellation points that exist closest to a Euclidean distance of 2d is always one. This is the basic characteristic of the gray code process whereby, even when the quality of transmitted data deteriorates such that erroneous identification of adjacent constellation points occurs due to noise, the decoder only produces a single bit error. This minimizes the probability of total bit error. As detailed earlier, the orthogonal coordinates I and Q can be defined by Table 1 below:

TABLE 1

| Signal No | $i_1$ | $i_2$ | Signal in I | Signal No | $q_1$ | $q_2$ | Signal in Q |
|---|---|---|---|---|---|---|---|
| $S_0^*(t)$ | 0 | 1 | +3d | $S_0^*(t)$ | 0 | 1 | +3d |
| $S_1^*(t)$ | 0 | 0 | +d | $S_1^*(t)$ | 0 | 0 | +d |
| $S_2^*(t)$ | 1 | 0 | −d | $S_2^*(t)$ | 1 | 0 | −d |
| $S_3^*(t)$ | 1 | 1 | −3d | $S_3^*(t)$ | 1 | 1 | −3d |

Because bits $i_1q_1i_2q_2$ in 4-bit 16 QAM are statistically independent, the orthogonal signals (see Table 1) are also independent. Further, I and Q are orthogonal and, hence, there is generally no loss of any kind and the analysis can be restricted to an analysis of only one orthogonal signal such as only an in-phase component I, for example. In this case, all the results obtained for component I can also be applied to component Q.

Here, the channel signal of the output of the 16 QAM modulator is $S_{il}^*(t)$. Using this notation, the initial index i denotes the channel number (1 or 2) and the second index denotes l={0,1,2,3}. According to Table 1, l=0, l=1, l=2, l=3 signifies $i_1i_2$="01", $i_1i_2$="00", $i_1i_2$="10", and $i_1i_2$="11" respectively. That is, l is determined by the two bits $i_1$, $i_2$ of the common mode component I. Henceforth, in order to simplify the notation, the notation becomes $s_{il}^*(t) \to S_{il}^*$; in order to omit the time dependency of signal $S_{il}^*(t)$. Signals affected by ICI at the inputs of the receiver units of the first and second channels from FIG. 7 can be expressed according to the following equation based on the linear coupling of the transmission signals $S_{1l}^*$, $S_{2l}^*$ of the first and second channels, where $\alpha_{12}=\alpha_{21}=\alpha$.

$$S_{1j}=S_{1l}^*+\alpha \cdot S_{2l}^*, \; S_{2j}=S_{2l}^*+\alpha \cdot S_{1l}^*; \; l=\{0, 1, 2, 3\}, j=\{0, 1, \ldots, 15\} \quad (1)$$

Only the first channel is considered here. The results for the second channel are obtained in the same manner. Table 2 shows the relationship between the received signal of the first channel and the transmission signals of the first and second channels in a case where $S_{1j}=Sj$.

TABLE 2

| | Channel 1 | | | Channel 2 | | |
|---|---|---|---|---|---|---|
| Signal in Chan. 1 | $S_{1l}^*$ | $i_1$ | $i_2$ | $S_{2l}^*$ | $i_1$ | $i_2$ |
| $S_0 = S_{13}^* + \alpha \cdot S_{23}^*$ | −3d | 1 | 1 | −3d | 1 | 1 |
| $S_1 = S_{13}^* + \alpha \cdot S_{22}^*$ | −3d | 1 | 1 | −d | 1 | 0 |
| $S_2 = S_{13}^* + \alpha \cdot S_{20}^*$ | −3d | 1 | 1 | +d | 0 | 1 |
| $S_3 = S_{13}^* + \alpha \cdot S_{21}^*$ | −3d | 1 | 1 | +3d | 0 | 0 |
| $S_4 = S_{12}^* + \alpha \cdot S_{23}^*$ | −d | 1 | 0 | −3d | 1 | 1 |
| $S_5 = S_{12}^* + \alpha \cdot S_{22}^*$ | −d | 1 | 0 | −d | 1 | 0 |
| $S_6 = S_{12}^* + \alpha \cdot S_{20}^*$ | −d | 1 | 0 | +d | 0 | 1 |
| $S_7 = S_{12}^* + \alpha \cdot S_{21}^*$ | −d | 1 | 0 | +3d | 0 | 0 |
| $S_8 = S_{10}^* + \alpha \cdot S_{23}^*$ | +3d | 0 | 1 | −3d | 1 | 1 |
| $S_9 = S_{10}^* + \alpha \cdot S_{22}^*$ | +3d | 0 | 1 | −d | 1 | 0 |
| $S_{10} = S_{10}^* + \alpha \cdot S_{20}^*$ | +3d | 0 | 1 | +d | 0 | 1 |
| $S_{11} = S_{10}^* + \alpha \cdot S_{21}^*$ | +3d | 0 | 1 | +3d | 0 | 0 |
| $S_{12} = S_{11}^* + \alpha \cdot S_{23}^*$ | +d | 0 | 0 | −3d | 1 | 1 |
| $S_{13} = S_{11}^* + \alpha \cdot S_{22}^*$ | +d | 0 | 0 | −d | 1 | 0 |
| $S_{14} = S_{11}^* + \alpha \cdot S_{20}^*$ | +d | 0 | 0 | +d | 0 | 1 |
| $S_{15} = S_{11}^* + \alpha \cdot S_{21}^*$ | +d | 0 | 0 | +3d | 0 | 0 |

According to Equation (1), after ICI has been considered, the input of the receiver unit of each channel has sixteen signals for j={0, 1, 2, . . . , 15} rather than the four transmission signals l={0, 1, 2, 3}.

The posterior probability of receiving the signal $S_j$ on the ith channel from Table 2 is given by the following equation according to Bayes' mixed rule:

$$P_i[i_1, i_2/y(t)] = P_i[S_j/y(t)] \qquad (2)$$
$$= \frac{P_{apr}(S_j) \cdot P(y(t)/S_j)}{P(y(t))}$$
$$\equiv k_0 \cdot P_{apr}(S_j) \cdot \exp\left\{-\frac{1}{N_0}\int_0^T [y(t) - S_j]^2 \, dt\right\}$$

where $k_0$ is the normalization factor;

j is the signal number, where j=0, 1, 2, . . . , 15;

y(t) is a synthesized signal rendered by synthesizing a signal sequence is accompanied by ICI with white Gaussian noise n(t) that has a spectral power intensity $N_0$(y(t)=$S_j$+n(t));

$P_i(S_j/y(t))$ is the posterior probability of receiving the signal $S_j$ on the ith channel (the probability that the received signal y(t) is $S_j$);

$P_i(i_1, i_2/y(t))$ is the posterior probability of receiving $(i_1, i_2)$ on the ith channel (the probability that the received signal y(t) is $(i_1, i_2)$);

$P_{apr}(S_j)$ is the prior probability of the received signal $S_j$;

$P(y(t)/S_{ij})$ is the probability that the transmitted code word is $S_j$ when the reception word is y(t), which is a conditional probability; and P(y(t)) is the probability of receiving y(t).

The probability P(y,(t)) of equation (2) is common to all the decision candidates and can therefore be disregarded. Further, the requirement for judging received information is to find a candidate information for which the numerator or right side of the Equation (2) is maximized.

The prior probability Papr $(S_j)$(j=0,1,2, . . . 15) of the first channel according to Equation (1) or Table 2 can be expressed as shown in Table 3 as a cross multiplication of the probabilities of two transmission information signals $S_{il}$*, i={1,2}, l={0, 1, 2, 3} of adjacent channels.

TABLE 3

| |
|---|
| $P_{apr}(S_0) = P_1(S_3^*) \cdot P_2(S_3^*)$ |
| $P_{apr}(S_1) = P_1(S_3^*) \cdot P_2(S_2^*)$ |
| $P_{apr}(S_2) = P_1(S_3^*) \cdot P_2(S_0^*)$ |
| $P_{apr}(S_3) = P_1(S_3^*) \cdot P_2(S_1^*)$ |
| $P_{apr}(S_4) = P_1(S_2^*) \cdot P_2(S_3^*)$ |
| $P_{apr}(S_5) = P_1(S_2^*) \cdot P_2(S_2^*)$ |
| $P_{apr}(S_6) = P_1(S_2^*) \cdot P_2(S_0^*)$ |
| $P_{apr}(S_7) = P_1(S_2^*) \cdot P_2(S_1^*)$ |
| $P_{apr}(S_8) = P_1(S_0^*) \cdot P_2(S_3^*)$ |
| $P_{apr}(S_9) = P_1(S_0^*) \cdot P_2(S_2^*)$ |
| $P_{apr}(S_{10}) = P_1(S_0^*) \cdot P_2(S_0^*)$ |
| $P_{apr}(S_{11}) = P_1(S_0^*) \cdot P_2(S_1^*)$ |
| $P_{apr}(S_{12}) = P_1(S_1^*) \cdot P_2(S_3^*)$ |
| $P_{apr}(S_{13}) = P_1(S_1^*) \cdot P_2(S_2^*)$ |
| $P_{apr}(S_{14}) = P_1(S_1^*) \cdot P_2(S_0^*)$ |
| $P_{apr}(S_{15}) = P_1(S_1^*) \cdot P_2(S_1^*)$ |

In this notation, $P_{apr}(S_j)$, j={0,1,2, . . . ,15} is the prior probability of the transmission of the signal number j, $P_i(S_l^*)$ is the transmission probability of signal $S_{il}$* on the ith channel. Accordingly, $P_1(S_l^*)$, l={0,1,2,3} is the transmission probability of signal $S_{1l}$* on the first channel. The transmission probability depends on the data statistics for the transmission source of bits $i_1$, $i_2$ on the first channel and can be largely assumed to be equal to ¼ in an actual case. The probability $P_2(S_l^*)$ is the transmission probability of the QAM symbol of the second channel $S_{2l}$*, l={0, 1, 2, 3} or the transmission probability of bits $i_1$ and $i_2$ on the second channel. It should be emphasized here that $P_2(S_l^*)$ is not equal to $P_1(S_l^*)$ and $P_2(S_l^*) \neq ¼$.

In order to estimate $P_2(S_l^*)$, the posterior probability of the received signal when a special data set $(i_1, i_2)$ is transmitted on the second channel is used. That is, $P_2(S_l^*) \approx P_2((i_1,i_2)/y(t))$ is used. This is the best estimation obtained in the case of an AWGN channel and, based on this supposition, Table 3 can be overwritten to produce Table 4.

TABLE 4

| |
|---|
| $P_{apr}(S_0) = P_1(S_3^*) \cdot P_2((1, 1)/y(t))$ |
| $P_{apr}(S_1) = P_1(S_3^*) \cdot P_2((1, 0)/y(t))$ |
| $P_{apr}(S_2) = P_1(S_3^*) \cdot P_2((0, 1)/y(t))$ |
| $P_{apr}(S_3) = P_1(S_3^*) \cdot P_2((0, 0)/y(t))$ |
| $P_{apr}(S_4) = P_1(S_2^*) \cdot P_2((1, 1)/y(t))$ |
| $P_{apr}(S_5) = P_1(S_2^*) \cdot P_2((1, 0)/y(t))$ |
| $P_{apr}(S_6) = P_1(S_2^*) \cdot P_2((0, 1)/y(t))$ |
| $P_{apr}(S_7) = P_1(S_2^*) \cdot P_2((0, 0)/y(t))$ |
| $P_{apr}(S_8) = P_1(S_0^*) \cdot P_2((1, 1)/y(t))$ |
| $P_{apr}(S_9) = P_1(S_0^*) \cdot P_2((1, 0)/y(t))$ |
| $P_{apr}(S_{10}) = P_1(S_0^*) \cdot P_2((0, 1)/y(t))$ |
| $P_{apr}(S_{11}) = P_1(S_0^*) \cdot P_2((0, 0)/y(t))$ |
| $P_{apr}(S_{12}) = P_1(S_1^*) \cdot P_2((1, 1)/y(t))$ |
| $P_{apr}(S_{12}) = P_1(S_1^*) \cdot P_2((1, 0)/y(t))$ |
| $P_{apr}(S_{14}) = P_1(S_1^*) \cdot P_2((0, 1)/y(t))$ |
| $P_{apr}(S_{15}) = P_1(S_1^*) \cdot P_2((0, 0)/y(t))$ |

Here, $P_i((i_1,i_2)/y(t))$, i={1, 2} is the probability that the data set $(i_1, i_2)$ of the received signal y(t) of the ith channel is $i_1=D_1$, and $i_2=D_2(D_1, D_2)=\{0, 1\}$). In order to simplify the notation, $P_i((i_1/i_2)/y(t))$ is written with the dependence of y(t) omitted therefrom, such that $P_i((i_1,i_2)/y(t)) \rightarrow P_i(i_1,i_2)$.

It is essential to determine the transmitted set $i_1$, $i_2$ on the first channel from the supplied input signal y(t). Because all the bits are statistically independent, the decision with respect to $i_1$, $i_2$ can be made independently and separately. The decision algorithm for $i_1$ will be described first.

(C) Decision Algorithm for $i_1$

The posterior probability $P_1(i_1/y(t))$ of receiving bit $i_1$ of the first channel is obtained as the total of the posterior probabilities of the signals $S_j$ (j=0, 1, 2 . . . , 15) that correspond to the transmission of the information bit $i_1$. The $S_j$ dependence of $i_2$ can be removed by averaging the signals from Table 2 including all possible $i_2$ for $i_1$. The reception posterior probabilities $P_1(i_1/y(t))$ for the channels of interest from Table 2 are written as follows:

$$P_1(i_1=1/y(t))=P_1(11)\cdot\{P(S_0)\cdot P_{apr}(S_0)+P(S_1)\cdot P_{apr}(S_1)+ P(S_2)\cdot P_{apr}(S_2)+P(S_3)\cdot P_{apr}(S_3)\}+P_1(10)\cdot\{P(S_4)\cdot P_{apr}(S_4)+P(S_5)\cdot P_{apr}(S_5)+P(S_6)\cdot P_{apr}(S_6)+P(S_7)\cdot P_{apr}(S_7)\} \qquad (3)$$

$$P_1(i_1=0/y(t))=P_1(01)\cdot\{P(S_8)\cdot P_{apr}(S_8)+P(S_9)\cdot P_{apr}(S_9)+ P(S_{10})\cdot P_{apr}(S_{10})+P(S_{11})\cdot P_{apr}(S_{11})\}+P_1(00)\cdot\{P(S_{12})\cdot P_{apr}(S_{12})+P(S_{13})\cdot P_{apr}(S_{13})+P(S_{14})\cdot P_{apr}(S_{14})+P(S_{15})\cdot P_{apr}(S_{15})\} \qquad (4)$$

The addition of Equations (3) and (4) serves to remove the dependency of $i_2$ of the $P_1(S_j/y(t))=P_1(i_1, i_2/y(t))$ by averaging all $i_2$. The signals $S_0$ to $S_7$ from Table 2 are used to transmit $i_1=1$, while the signals $S_8, \ldots S_{15}$ are used to transmit $i_1=0$. In Equations (3) and (4), $P_1(i_1, i_2)$ is the transmission probability that bits $i_1$ and $i_2$ on the first channel will have a certain value. At this stage, this can be regarded as the prior probability of the transmission couple bits 11, 10, 01, 00 on the first channel.

Here, the following points should be re-emphasized. Even when the bits of this channel are independent and of equal probability, the decisions for these bits are executed independently and separately and it cannot be established that $P_1(i_1, i_2)$ is ¼. While the decision with respect to $i_1$ is executed, an independent decision with respect to $i_2$ can be estimated by the receiver with a high degree of reliability. In other words, while the decision with respect to $i_1$ is executed, the following equation can be applied.

$$P_1(i_1,i_2)=P_1(i_1)\cdot P_1(i_2=\pm 1/y(t))=0.5\cdot P_1(i_2/y(t)) \quad (5)$$

Here, $P_1(i_2/y(t))$ is the probability that bit $i_2$ on the first channel will have a certain value D={0, 1}. The relationship of Table 3 can substitute $P_{apr}(S_j)$ of Equations (3) and (4) according to the direct relationship in Table 2 between 16 QAM symbol $S_{ii}*(t)$ and the information bits $i_1$ and $i_2$. The same assumption for bits $i_1, i_2$ derives $P_1(S_l*)=¼, l=\{0,1,2,3\}$ and is the same for all the decision candidates. This element can therefore be ignored. Further, $P_2(S_l*)=P_2(i_1,i_2)$. When this is considered, equations (3) and (4) become Equations (6) and (7) below.

$$P_1(i_1=1/y(t))=P_1(11)\cdot\{P(S_0)\cdot P_2(11)+P(S_1)\cdot P_2(10)+P(S_2)\cdot P_2(01)+P(S_3)\cdot P_2(00)\}+P_1(10)\cdot\{P(S_4)\cdot P_2(11)+P(S_5)\cdot P_2(10)+P(S_6)\cdot P_2(01)+P(S_7)\cdot P_2(00)\} \quad (6)$$

$$P(i_1=0/y(t))=P_1(01)\cdot\{P(S_8)\cdot P_2(11)+P(S_9)\cdot P_2(10)+P(S_{10})\cdot P_2(01)+P(S_{11})\cdot P_2(00)\}+P_1(01)\cdot\{P(S_{12})\cdot P_2(11)+P(S_{13})\cdot P_2(10)+P(S_{14})\cdot P_2(01)+P(S_{15})\cdot P_2(00)\} \quad (7)$$

In the case of a maximum posterior probability receiver, code with the received information bit $i_1$ is determined in accordance with a logarithm for the comparison result or threshold of the posterior probability. That is, the code (0 or 1) of the received information bit $i_1$ can be determined by means of a comparison of the sizes of the probabilities that the received information bit $i_1$ will be 1 and 0 respectively or by means of a comparison of the difference between these logarithms and the thresholds thereof. Hence, the first bit $i_1$ of the first channel is found by means of the following equation:

$$\frac{P_1(i_1=1/y(t))}{P_1(i_1=0/y(t))} >/< 1$$

or $$\ln P_1(i_1=1/y(t))-\ln P_1(i_1=0/y(t)) >/< 0 \quad (8)$$

Here, when $\ln P_1(i_1=1/y(t))$ and $\ln P_1(i_1=0/y(t))$ in Equation (8) are modified by considering the algebraic identity of the following equation:

$$\ln(e^X+e^Y) = \frac{X+Y}{2}+\ln 2 + \ln\cosh\left(\frac{X-Y}{2}\right) \quad (9)$$

$\ln P_1(i_1=1/y(t))$ and $\ln P_1(i_1=0/y(t))$ become the following Equations (10) and (11) respectively:

$$\ln P_1(i_1=1/y(t)) = 0.5\cdot\ln P_1(11) + \\ 0.5\cdot\ln\{P(S_0)\cdot P_2(11)+P(S_1)\cdot P_2(10)+P(S_2)\cdot P_2(01)+P(S_3)\cdot P_2(00)\}+ \\ 0.5\cdot\ln P_1(10)+ \\ 0.5\cdot\ln\{P(S_4)\cdot P_2(11)+P(S_5)\cdot P_2(10)+P(S_6)\cdot P_2(01)+P(S_7)\cdot P_2(00)\}+ \\ \ln\cosh\left\{0.5\cdot\begin{pmatrix}\ln P_1(11)-\ln P_1(10)+\\ \ln(P(S_0)P_2(11)+P(S_1)P_2(10)+\\ P(S_2)P_2(01)+P(S_3)P_2(00))-\\ \ln(P(S_4)P_2(11)+P(S_5)P_2(10)+\\ P(S_6)P_2(01)+P(S_7)P_2(00))\end{pmatrix}\right\} \quad (10)$$

$$\ln P_1(i_1=0/y(t)) = 0.5\cdot\ln P_1(01) + \\ 0.5\cdot\ln\{P(S_8)\cdot P_2(11)+P(S_9)\cdot P_2(10)+P(S_{10})\cdot P_2(01)+P(S_{11})\cdot P_2(00)\}+ \\ 0.5\cdot\ln P_1(00)+ \\ 0.5\cdot\ln\{P(S_{12})\cdot P_2(11)+P(S_{13})\cdot P_2(10)+P(S_{14})\cdot P_2(01)+P(S_{15})\cdot P_2(00)\}+ \\ \ln\cosh\left\{0.5\cdot\begin{pmatrix}\ln P_1(01)-\ln P_1(00)+\\ \ln(P(S_8)P_2(11)+P(S_9)P(10)+\\ P(S_{10})P_2(01)+P(S_{11})P_2(00))-\\ \ln(P(S_{12})P_2(11)+P(S_{13})P_2(10)+\\ P(S_{14})P_2(01)+P(S_{15})P_2(00))\end{pmatrix}\right\} \quad (11)$$

For example, supposing that, for $\ln P_1(i_1=1/y(t))$, the first term on the right side of Equation (6) is $e^X$ and the second term on the right side is $e^Y$, that is, $$e^X=P_1(11)\cdot\{P(S_0)\cdot P_2(11)+P(S_1)\cdot P_2(10)+P(S_2)\cdot P_2(01)+P(S_3)\cdot P_2(00)\}$$

$$e^Y=P_1(10)\cdot\{P(S_4)\cdot P_2(11)+P(S_5)\cdot P_2(10)+P(S_6)\cdot P_2(01)+P(S_7)\cdot P_2(00)\},$$

this yields:

$$X=\ln P_1(11)+\ln\{P(S_0)\cdot P_2(11)+P(S_1)\cdot P_2(10)+P(S_2)\cdot P_2(01)+P(S_3)\cdot P_2(00)\}$$

$$Y=\ln P_1(10)+\ln\{P(S_4)\cdot P_2(11)+P(S_5)\cdot P_2(10)+P(S_6)\cdot P_2(01)+P(S_7)\cdot P_2(00)\}.$$

If X and Y are substituted into Equation (9), $\ln P_1(i_1=1/y(t))$ of Equation (10) is found. Likewise, for $\ln P_1(i_1=0/y(t))$, if the first term on the right side of Equation (7) is $e^X$ and the second term on the right side is $e^Y$, Equation (11) is obtained. Further, if lncosh $\{\bullet\}$ in Equations (10) and (11) is omitted for the sake of simplification, (reconsidered thereafter), $\Delta\ln P_1(i_1=1/y(t))=\Delta\ln P_1(i_1=1/y(t))-\Delta\ln P_1(i_1=0/y(t))$ in Equation (8) becomes Equation (12).

$$\Delta\ln P_1(i_1/y(t))=\ln P(i_1=1/y(t))-\ln P(i_1=0/y(t))=0.5\cdot(\ln P_1(11)+\ln P_1(10)-\ln P_1(01)-\ln P_1(00))+\ln\{P(S_0)\cdot P_2(11)+P(S_1)\cdot P_2(10)+P(S_2)\cdot P_2(01)+P(S_3)\cdot P_2(00)\}+\ln\{P(S_4)\cdot P_2(11)+P(S_5)\cdot P_2(10)+P(S_6)\cdot P_2(01)+P(S_7)\cdot P_2(00)\}-\ln\{P(S_8)\cdot P_2(11)+P(S_9)\cdot P_2(10)+P(S_{10})\cdot P_2(01)+P(S_{11})\cdot P_2(00)\}-\ln\{P(S_{12})\cdot P_2(11)+P(S_{13})\cdot P_2(10)+P(S_{14})\cdot P_2(01)+P(S_{15})\cdot P_2(00)\} \quad (12)$$

If Equation (12) is modified further by considering the algebraic identity of Equation (9) and lncosh $\{\bullet\}$ is reconsidered, Equation (13) is obtained. For the method of deriving Equation (13), kindly refer to appendix A.

$$\Delta \ln P_1(i_1/y(t)) = \Delta \ln P_1(i_1) - 4 \cdot d \cdot y + \quad (13)$$

$$0.25 \cdot \begin{pmatrix} \ln \cosh\{0.5(-2\alpha \cdot d \cdot y - \Delta E_{01} + \Delta \ln P_2(i_2))\} - \\ \ln \cosh\{0.5(-2\alpha \cdot d \cdot y + \Delta E_{01} - \Delta \ln P_2(i_2))\} + \\ \ln \cosh\{0.5(-2\alpha \cdot d \cdot y - \Delta E_{32} - \Delta \ln P_2(i_2))\} - \\ \ln \cosh\{0.5(-2\alpha \cdot d \cdot y + \Delta E_{32} + \Delta \ln P_2(i_2))\} + \\ \ln \cosh\{0.5(-2\alpha \cdot d \cdot y - \Delta E_{45} + \Delta \ln P_2(i_2))\} - \\ \ln \cosh\{0.5(-2\alpha \cdot d \cdot y + \Delta E_{45} - \Delta \ln P_2(i_2))\} + \\ \ln \cosh\{0.5(-2\alpha \cdot d \cdot y - \Delta E_{76} - \Delta \ln P_2(i_2))\} - \\ \ln \cosh\{0.5(-2\alpha \cdot d \cdot y + \Delta E_{76} + \Delta \ln P_2(i_2))\} \end{pmatrix} +$$

$$0.50 \cdot \begin{pmatrix} \ln \cosh\{0.5(-4\alpha \cdot d \cdot y - \Delta E_{02} - \Delta E_{13} + \Delta \ln P_2(i_1))\} - \\ \ln \cosh\{0.5(-4\alpha \cdot d \cdot y + \Delta E_{810} + \Delta E_{911} + \Delta \ln P_2(i_1))\} + \\ \ln \cosh\{0.5(-4\alpha \cdot d \cdot y - \Delta E_{46} - \Delta E_{57} + \Delta \ln P_2(i_1))\} - \\ \ln \cosh\{0.5(-4\alpha \cdot d \cdot y + \Delta E_{1412} + \Delta E_{1513} + \Delta \ln P_2(i_1))\} \end{pmatrix} +$$

$$025 \cdot \begin{pmatrix} \ln \cosh\{0.5(-2\alpha \cdot d \cdot y - (\Delta E_{04} + \Delta E_{15} + \Delta E_{26} + \Delta E_{37}) + \\ \Delta \ln P_1(i_2))\} - \\ \ln \cosh\{0.5(-2\alpha \cdot d \cdot y + (\Delta E_{128} + \Delta E_{139} + \Delta E_{1410} + \Delta E_{1511}) + \\ \Delta \ln P_1(i_2))\} \end{pmatrix}$$

In Equation (13), the amplitude of the received signal is unchanged over cycle T for the sake of simplifying the equation. Hence, the reference signal $S_j(t)$ is also constant over this period. Further, y and $\Delta E_{mn}$ below are introduced to Equation (13). That is, according to Equation (2), $$\ln P(S_j/y(t)) = \frac{2}{N_0}\int_0^T y(t) \cdot S_j(t)\,dt - \frac{E_j}{N_0} \quad (j = 0, 1, 2, \ldots 15) \quad (14)$$

is established. However, $E_j$ is the energy of signal $S_j$, such that:

$$E_j = \int_0^T S_j(t)^2\,dt$$

The first term on the right side of Equation (14) is a correlation between the signal y(t) and the reference signal $S_j$. In order to simplify the notation in Equation (14), y is introduced as follows:

$$y \rightarrow \frac{2}{N_0}\int_0^T y(t)\,dt$$

Accordingly, Equation (14) becomes:

$$\ln P(S_j/y(t)) = \ln P(S_j) = y \cdot S_j(t) - \frac{E_j}{N_0} \quad (14)'$$

Further, the energy difference $\Delta E_{mn}$ between signals $S_m$ and $S_n$ is introduced and defined as:

$$\Delta E_{mn} = (E_m - E_n)/N_0$$

The following equations are established according to the energy differences from Table 2.

$$\Delta E_{01} = \Delta E_{1011} = (12\alpha + 8\alpha^2) \cdot d^2;\ \Delta E_{32} = \Delta E_{98} = (12\alpha - 8\alpha^2) \cdot d^2$$

$$\Delta E_{45} = \Delta E_{1514} = (4\alpha + 8\alpha^2) \cdot d^2;\ \Delta E_{76} = \Delta E_{1213} = (4\alpha - 8\alpha^2) \cdot d^2$$

$$\Delta E_{02} + \Delta E_{13} = \Delta E_{810} + \Delta E_{911} = 48\alpha \cdot d^2;\ \Delta E_{46} + \Delta E_{57} = \Delta E_{1412} + \Delta E_{1513} = 16\alpha \cdot d^2$$

$$\Delta E_{04} + \Delta E_{15} + \Delta E_{26} + \Delta E_{37} = \Delta E_{128} + \Delta E_{139} + \Delta E_{1410} + \Delta E_{1511} = 32 \cdot d^2 \quad (15)$$

For example, $\Delta E_{01} = (E_0 - E_1) = (-3d - 3da)^2 - (-3d - da)^2 = (12a - 8a2)^2$.

Figure 8:
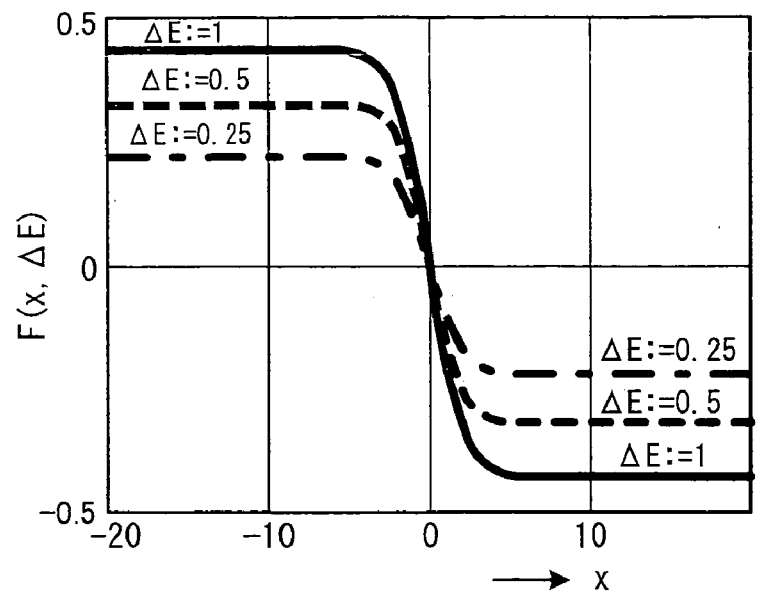
FIG. 8 is a transmission function for a nonlinear unit.
Figure 9:
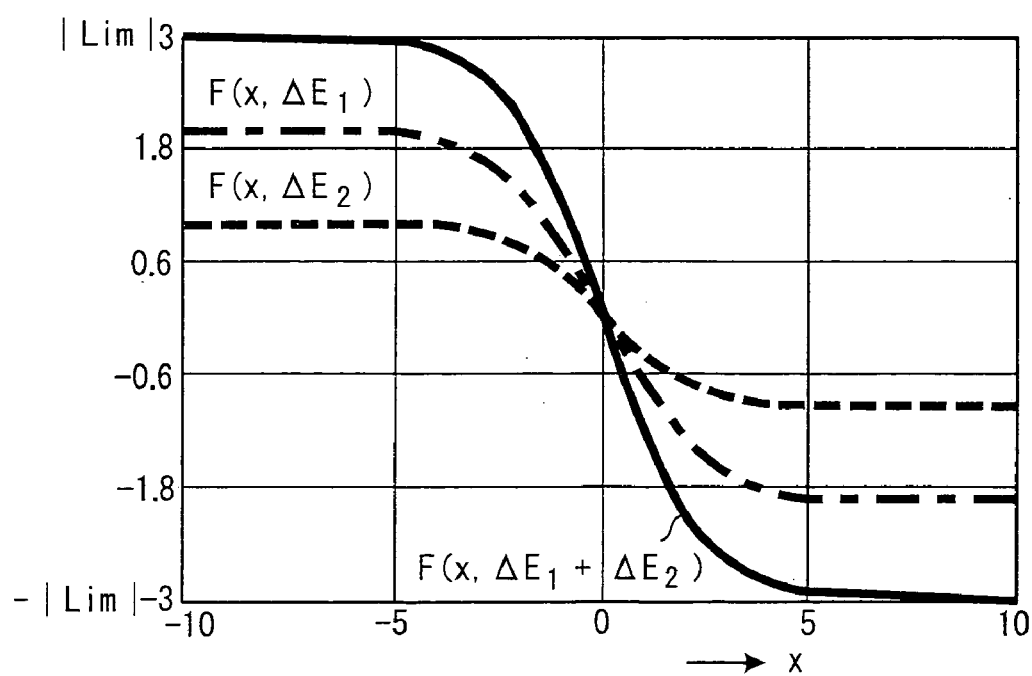
FIG. 9 is a synthesized transmission function when nonlinear units are synthesized.

The following nonlinear function for Equation (13):

$$F(x, \Delta E) = \ln \cosh\left\{\frac{x - \Delta E}{2}\right\} - \ln \cosh\left\{\frac{x + \Delta E}{2}\right\} \quad (16)$$

can be written as a limiter with a linear region. The limit level of the nonlinear function is dependent on the S/N ratio (noise spectral power intensity $N_0$) and the energy difference $\Delta E_{mn}$ between the signals $S_m$ and $S_n$. FIG. 8 shows a nonlinear function $F(x, \Delta E)$ when the difference $\Delta E_{mn}$ is the parameter. The relation of the following equation $$F\left(x, \sum_i \Delta E_i\right) = F(x, \Delta E_1) + F(x, \Delta E_2) + F(x, \Delta E_3) + \ldots \quad (17)$$

is established for the nonlinear function. FIG. 9 shows the characteristics of the nonlinear functions $F(x, \Delta E_1 + \Delta E_2)$, $F(x, \Delta E_1)$, $F(x, \Delta E_2)$. When the third term on the right side of Equation (13) is modified by using the relation of Equation (17), Equation (18) is produced.

$$\begin{pmatrix} \text{lncosh}\{0.5(-2\alpha \cdot d \cdot y - \Delta E_{01} + \Delta \ln P_2(i_2))\} - \\ \text{lncosh}\{0.5(-2\alpha \cdot d \cdot y + \Delta E_{01} + \Delta \ln P_2(i_2))\} + \\ \text{lncosh}\{0.5(-2\alpha \cdot d \cdot y - \Delta E_{32} + \Delta \ln P_2(i_2))\} - \\ \text{lncosh}\{0.5(-2\alpha \cdot d \cdot y + \Delta E_{32} + \Delta \ln P_2(i_2))\} + \\ \text{lncosh}\{0.5(-2\alpha \cdot d \cdot y - \Delta E_{45} + \Delta \ln P_2(i_2))\} - \\ \text{lncosh}\{0.5(-2\alpha \cdot d \cdot y + \Delta E_{45} + \Delta \ln P_2(i_2))\} + \\ \text{lncosh}\{0.5(-2\alpha \cdot d \cdot y - \Delta E_{76} + \Delta \ln P_2(i_2))\} - \\ \text{lncosh}\{0.5(-2\alpha \cdot d \cdot y + \Delta E_{76} + \Delta \ln P_2(i_2))\} \end{pmatrix} = $$

$$\text{lncosh}\{0.5(-2\alpha \cdot d \cdot y - \Delta E_{\Sigma 1}) + \Delta \ln P_2(i_2)\} - $$
$$\text{lncosh}\{0.5(-2\alpha \cdot d \cdot y + \Delta E_{\Sigma 1}) + \Delta \ln P_2(i_2)\} \quad (18)$$

Further, when the fourth term on the right side of Equation (13) is modified by using the relation in Equation (17), Equation (19) is produced.

$$\begin{pmatrix} \text{lncosh}\{0.5(-4\alpha \cdot d \cdot y - \Delta E_{02} - \Delta E_{13} + \Delta \ln P_2(i_1))\} - \\ \text{lncosh}\{0.5(-4\alpha \cdot d \cdot y + \Delta E_{810} + \Delta E_{911} + \Delta \ln P_2(i_1))\} + \\ \text{lncosh}\{0.5(-4\alpha \cdot d \cdot y - \Delta E_{46} - \Delta E_{57} + \Delta \ln P_2(i_1))\} - \\ \text{lncosh}\{0.5(-4\alpha \cdot d \cdot y + \Delta E_{1412} + \Delta E_{1513} + \Delta \ln P_2(i_1))\} \end{pmatrix} = $$

$$\text{lncosh}\{0.5(-4\alpha \cdot d \cdot y - \Delta E_{\Sigma 2}) + \Delta \ln P_2(i_1)\} - $$
$$\text{lncosh}\{0.5(-4\alpha \cdot d \cdot y + \Delta E_{\Sigma 2}) + \Delta \ln P_2(i_1)\} \quad (19)$$

The above equation is the probability $\Delta \ln P_1(i_1/y(t))$ of the first bit $i_1$ of the first channel. If this probability is greater than 0, $i_1$="1" and if this probability is smaller than 0, $i_1$="0".

(D) First Channel/First Bit $i_1$ Turbo Receiver

Figure 10:
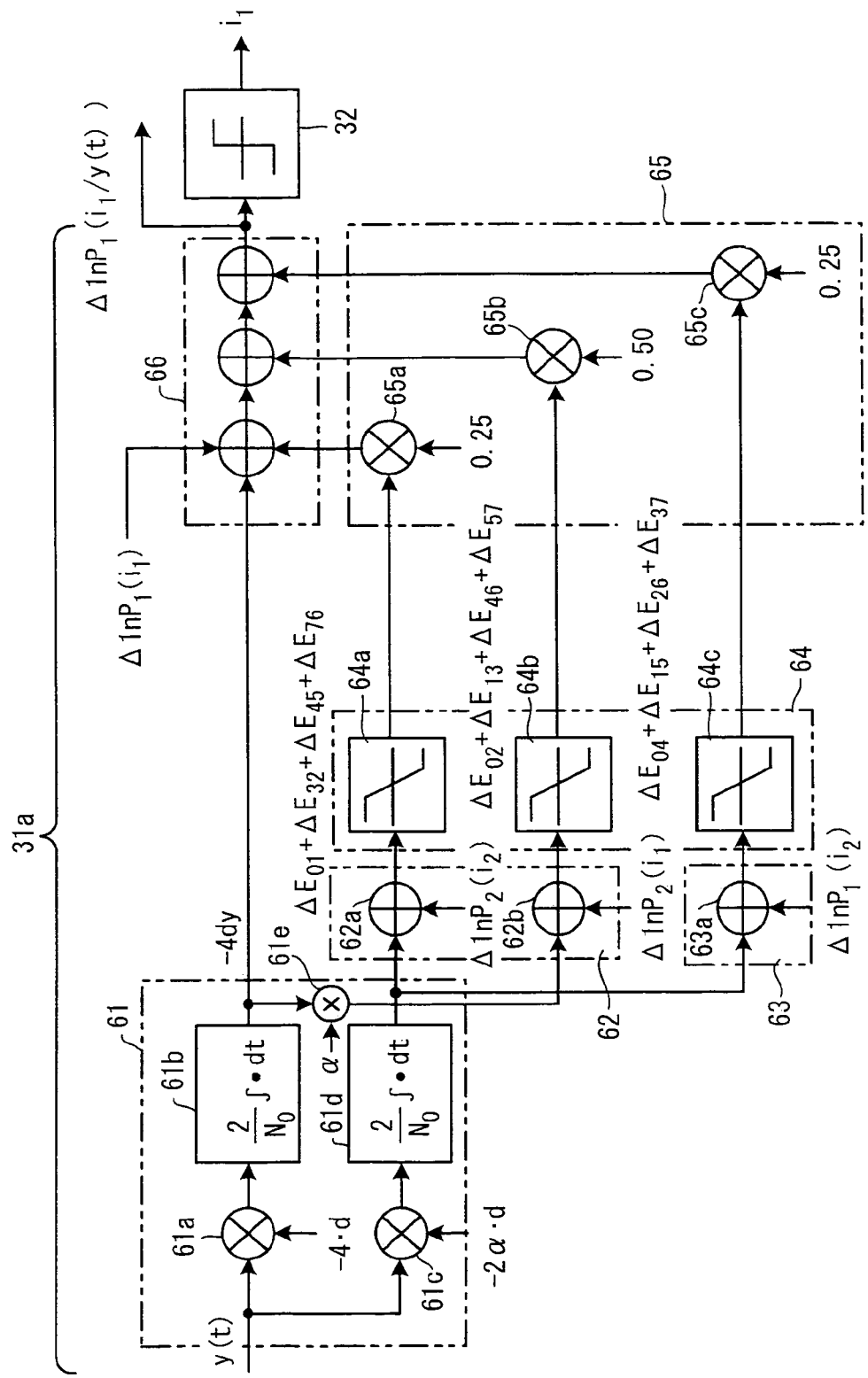
FIG. 10 is a constitutional view of the first channel/first bit receiver portion the present invention.

FIG. 10 is a block diagram of a turbo receiver that estimates the probability $\Delta \ln P_1(i_1/y(t))$ of the first bit $i_1$ of the first channel by means of Equation (13) in which blocks are rendered by using the relations of Equations (18) and (19). The constitution of the blocks can be simplified by using the relations of Equations (18) and (19).

In a broad classification, the first channel/first bit $i_1$ turbo receiver is constituted by a receiver portion 31a and a symbol decision unit 32, wherein the receiver portion 31a comprises a correlation unit (may also be a matched filter) 61, an other channel decision result operation unit 62, an own channel second bit decision result operation unit 63, a nonlinear unit 64, a coefficient multiplication unit 65 and a synthesizer unit 66.

A first multiplication unit 61a, first integrator 61b, second multiplication unit 61c; and second integrator 61d of the correlation unit 61 integrate the results of multiplying the received signal y(t) by predetermined reference signals $S_0$ to $S_{15}$ and the multiplication unit 61e multiplies the output −4dy of the first integrator 61b by a. The other channel decision result operation unit 62 comprises adders 62a and 62b, wherein the adder 62a adds the probability $\Delta \ln P_2(i_2)$ of the second bit of the second channel to the output signal of the second integrator 61d and the adder 62b adds the probability $\Delta \ln P_2(i_1)$ of the first bit of the second channel to the output signal of the first integrator 61b that has been multiplied by a. The own channel decision result operation unit 63 comprises an adder 63a, wherein the adder 63a adds the probability $\Delta \ln_1(i_2)$ of the second bit of the first channel to the output signal of the second integrator 61d.

The nonlinear unit 64a executes a nonlinear calculation of the third term on the right side of Equation (13), the nonlinear unit 64b executes a nonlinear calculation of the fourth term on the right side of Equation (13), and the nonlinear unit 64c executes a nonlinear calculation of the fifth term on the right side of Equation (13). Each of the multiplication units 65a to 65c of the coefficient-multiplication unit 65 calculates the third to fifth terms on the right side of Equation (13) by multiplying the output of the nonlinear units 64a to 64c by the constants 0.25, 0.50, and 0.25 respectively, the synthesizer unit 66 adds the first to fifth terms on the right side of Equation (13) and outputs the probability $\Delta \ln P_1(i_1/y(t))$ of the first bit $i_1$ of the first channel, and the symbol decision unit 32 decides whether the code of the first bit $i_1$ is "+" or "−", that is, "0" or "1", depending on whether the probability $\Delta \ln P_1(i_1/y(t))$ is greater or smaller than 0.

The probability $\Delta \ln P_1(i_1/y(t))$ is fed back to the turbo receiver of the second bit $i_2$ and to the turbo receivers of the first and second bits of the second channel. Although the first term on the right side of Equation (13) was omitted earlier on account of being small, if necessary, $\Delta \ln P_1(i_1)$ can also be added by the synthesizer unit 66.

Further, the constitution of FIG. 10 can also be used when receiving the first bit $q_1$ of the Quadrature component of the first channel. The constitution of FIG. 10 can also be used when receiving the first bits $i_1$ and $q_1$ of the common mode component and Quadrature component of the second channel respectively.

(E) Decision Algorithm for Second Bit $i_2$

Similarly to the first bit $i_1$, the reception posterior probability $P_1(i_2/y(t))$ of the first channel/second bit is obtained as the sum of the posterior probabilities of the signals $S_j$ corresponding to the transmission of the information bit $i_2$. The dependency of $i_1$ on $S_j$ can be removed by averaging the signals for all the possible $i_1$ from Table 2. The reception posterior probabilities $P_1(i_2/y(t))$ of the channels of interest from Table 2 are written as below.

$$P_1(i_2=1/y(t))=P_1(11)\cdot\{P(S_0)\cdot P_{apr}(S_0)+P(S_1)\cdot P_{apr}(S_1)+P(S_2)\cdot P_{apr}(S_2)+P(S_3)\cdot P_{apr}(S_3)\}+P_1(01)\cdot\{P(S_8)\cdot P_{apr}(S_8)+P(S_9)\cdot P_{apr}(S_9)+P(S_{10})\cdot P_{apr}(S_{10})+P(S_{11})\cdot P_{apr}(S_{11})\} \quad (20)$$

$$P_1(i_1=0/y(t))=P_1(10)\cdot\{P(S_4)\cdot P_{apr}(S_4)+P(S_5)\cdot P_{apr}(S_5)+P(S_6)\cdot P_{apr}(S_6)+P(S_7)\cdot P_{apr}(S_7)\}+P_1(00)\cdot\{P(S_{12})\cdot P_{apr}(S_{12})+P(S_{13})\cdot P_{apr}(S_{13})+P(S_{14})\cdot P_{apr}(S_{14})+P(S_{15})\cdot P_{apr}(S_{15})\} \quad (21)$$

Care must be taken to make the combinations of the signals $S_j$ in Equations (20) and (21) different from those in Equations (3) and (4). Here, the same signal notation system as in Table 2 is used. Similarly to Equations (3) and (4), the addition of Equations (20) and (21) serves to remove the dependency of $i_1$ in $P_2(S_j/y(t))=P_2(i_1,i_2/y(t))$ by averaging $P_2(S_j/y(t))$ for all the $i_1$. The signals $S_0$ to $S_3$ and $S_8$ to $S_{11}$ from Table 2 are used to transmit $i_2$=1, while signals $S_4$ to $S_7$ and $S_{12}$ to $S_{15}$ are used to transmit $i_2$=0.

The following equation is obtained for bit $i_1$ as per Equations (6) and (7) according to the direct relationship in Table 3 between 16 QAM symbol $P_1(S_l^*)$, $l$={0,1,2,3} and the information bits $i_1$ and $i_2$.

$$P_1(i_2=1/y(t))=P_1(11)\cdot\{P(S_0)\cdot P_2(11)+P(S_1)\cdot P_2(10)+P(S_2)\cdot P_2(01)+P(S_3)\cdot P_2(00)\}+P_1(10)\cdot\{P(S_8)\cdot P_2(11)+P(S_9)\cdot P_2(10)+P(S_{10})\cdot P_2(01)+P(S_{11})\cdot P_2(00)\} \quad (22)$$

$$P_1(i_2=0/y(t))=P_1(01)\cdot\{P(S_4)\cdot P_2(11)+P(S_5)\cdot P_2(10)+P(S_6)\cdot P_2(01)+P(S_7)\cdot P_2(00)\}+P_1(00)\cdot\{P(S_{12})\cdot P_2(11)+P(S_{13})\cdot P_2(10)+P(S_{14})\cdot P_2(01)+P(S_{15})\cdot P_2(00)\} \quad (23)$$

Here, attention should be drawn to the fact that Equations (22) and (23) are the same as Equations (6) and (7). The difference lies only in the combination. Hence, all the results obtained in appendix A can also be adopted for Equations (22)

and (23). The following equations are obtained by applying the decision rules of Equation (8) for the second bit of the first channel (see appendix A).

$$\Delta \ln P_1(i_2/y(t)) = \ln P_1(i_2 = 1/y(t)) - \ln P_1(i_2 = 0/y(t)) \qquad (24)$$
$$= 0.5 \cdot (\ln P_1(11) + \ln P_1(01) - \ln P_1(10) - \ln P_1(00)) +$$
$$\ln\{P(S_0) \cdot P_2(11) + P(S_1) \cdot P_2(10) +$$
$$P(S_2) \cdot P_2(01) + P(S_3) \cdot P_2(00)\} +$$
$$\ln\{P(S_8) \cdot P_2(11) + P(S_9) \cdot P_2(10) +$$
$$P(S_{10}) \cdot P_2(01) + P(S_{11}) \cdot P_2(00)\} -$$
$$\ln\{P(S_4) \cdot P_2(11) + P(S_5) \cdot P_2(10) +$$
$$P(S_6) \cdot P_2(01) + P(S_7) \cdot P_2(00)\} -$$
$$\ln\{P(S_{12}) \cdot P_2(11) + P(S_{13}) \cdot P_2(10) +$$
$$P(S_{14}) \cdot P_2(01) + P(S_{15}) \cdot P_2(00)\}$$

$$\Delta \ln P_1(i_2/y(t)) = \Delta \ln P_1(i_2) - 8 \cdot d^2/N_0 + \qquad (25)$$

$$0.25 \cdot \begin{pmatrix} \ln\cosh\{0.5(-2\alpha \cdot d \cdot y - \Delta E_{01} + \Delta \ln P_2(i_2))\} - \\ \ln\cosh\{0.5(-2\alpha \cdot d \cdot y - \Delta E_{45} + \Delta \ln P_2(i_2))\} + \\ \ln\cosh\{0.5(-2\alpha \cdot d \cdot y - \Delta E_{32} - \Delta \ln P_2(i_2))\} - \\ \ln\cosh\{0.5(-2\alpha \cdot d \cdot y - \Delta E_{76} - \Delta \ln P_2(i_2))\} + \\ \ln\cosh\{0.5(-2\alpha \cdot d \cdot y + \Delta E_{32} + \Delta \ln P_2(i_2))\} - \\ \ln\cosh\{0.5(-2\alpha \cdot d \cdot y + \Delta E_{76} + \Delta \ln P_2(i_2))\} + \\ \ln\cosh\{0.5(-2\alpha \cdot d \cdot y + \Delta E_{01} - \Delta \ln P_2(i_2))\} - \\ \ln\cosh\{0.5(-2\alpha \cdot d \cdot y + \Delta E_{45} - \Delta \ln P_2(i_2))\} \end{pmatrix} +$$

$$0.50 \cdot \begin{pmatrix} \ln\cosh\{0.5(-4\alpha \cdot d \cdot y - \Delta E_{02} - \Delta E_{13} + \Delta \ln P_2(i_1))\} - \\ \ln\cosh\{0.5(-4\alpha \cdot d \cdot y + \Delta E_{46} + \Delta E_{57} + \Delta \ln P_2(i_1))\} + \\ \ln\cosh\{0.5(-4\alpha \cdot d \cdot y - \Delta E_{810} - \Delta E_{911} + \Delta \ln P_2(i_1))\} - \\ \ln\cosh\{0.5(-4\alpha \cdot d \cdot y + \Delta E_{1412} + \Delta E_{1513} + \Delta \ln P_2(i_1))\} \end{pmatrix} +$$

$$\ln\left\{\cosh\left\{0.5\begin{pmatrix} \Delta \ln P_1(i_1) - 6 \cdot d \cdot y + 0.5 \cdot (\\ \ln\cosh\{0.5(-2\alpha \cdot d \cdot y - \Delta E_{01} - \Delta \ln P_2(i_2))\} - \\ \ln\cosh\{0.5(-2\alpha \cdot d \cdot y + \Delta E_{01} + \Delta \ln P_2(i_2))\} + \\ \ln\cosh\{0.5(-2\alpha \cdot d \cdot y - \Delta E_{32} - \Delta \ln P_2(i_2))\} - \\ \ln\cosh\{0.5(-2\alpha \cdot d \cdot y + \Delta E_{32} + \Delta \ln P_2(i_2))\}) \end{pmatrix} + \begin{matrix} \ln\cosh\{0.5(-4\alpha \cdot d \cdot y - \Delta E_{02} - \Delta E_{13} + \Delta \ln P_2(i_1))\} - \\ \ln\cosh\{0.5(-4\alpha \cdot d \cdot y + \Delta E_{02} + \Delta E_{13} + \Delta \ln P_2(i_1))\} \end{matrix}\right\}\right\} -$$

$$\ln\left\{\cosh\left\{0.5\begin{pmatrix} \Delta \ln P_1(i_1) - 2 \cdot d \cdot y + 0.5 \cdot (\\ \ln\cosh\{0.5(-2\alpha \cdot d \cdot y - \Delta E_{45} - \Delta \ln P_2(i_2))\} - \\ \ln\cosh\{0.5(-2\alpha \cdot d \cdot y + \Delta E_{45} + \Delta \ln P_2(i_2))\} + \\ \ln\cosh\{0.5(-2\alpha \cdot d \cdot y - \Delta E_{76} - \Delta \ln P_2(i_2))\} - \\ \ln\cosh\{0.5(-2\alpha \cdot d \cdot y + \Delta E_{76} + \Delta \ln P_2(i_2))\}) \end{pmatrix} + \begin{matrix} \ln\cosh\{0.5(-4\alpha \cdot d \cdot y - \Delta E_{46} - \Delta E_{57} + \Delta \ln P_2(i_1))\} - \\ \ln\cosh\{0.5(-4\alpha \cdot d \cdot y + \Delta E_{46} + \Delta E_{57} + \Delta \ln P_2(i_1))\} \end{matrix}\right\}\right\}$$

The decision expression for the second bit of Equation (25) can be regarded as complex in comparison with the decision expression for the first bit (Equation (13)). However, the linear part comprises symmetrical opposite terms as is clear from Equation (25). In order to avoid additional complexity, several approximations are introduced. First, the sum of two nonlinear functions of an actual argument x with symmetrical opposite terms as shown in Equation (26) may be considered.

$$F_1(x, \Delta E_1, \Delta E_2) = \log\{\cosh\{0.5(x - \Delta E_1)\}\} - \log\{\cosh\{0.5(x + \Delta E_2)\}\}$$

$$F_2(x, \Delta E_1, \Delta E_2) = \log\{\cosh\{0.5(x + \Delta E_1)\}\} - \log\{\cosh\{0.5(x - \Delta E_2)\}\} + F_\Sigma(x, \Delta E_1, \Delta E_2) = F_1(x, \Delta E_1, \Delta E_2) + F_2(x, \Delta E_1, \Delta E_2) \qquad (26)$$

Figure 11:
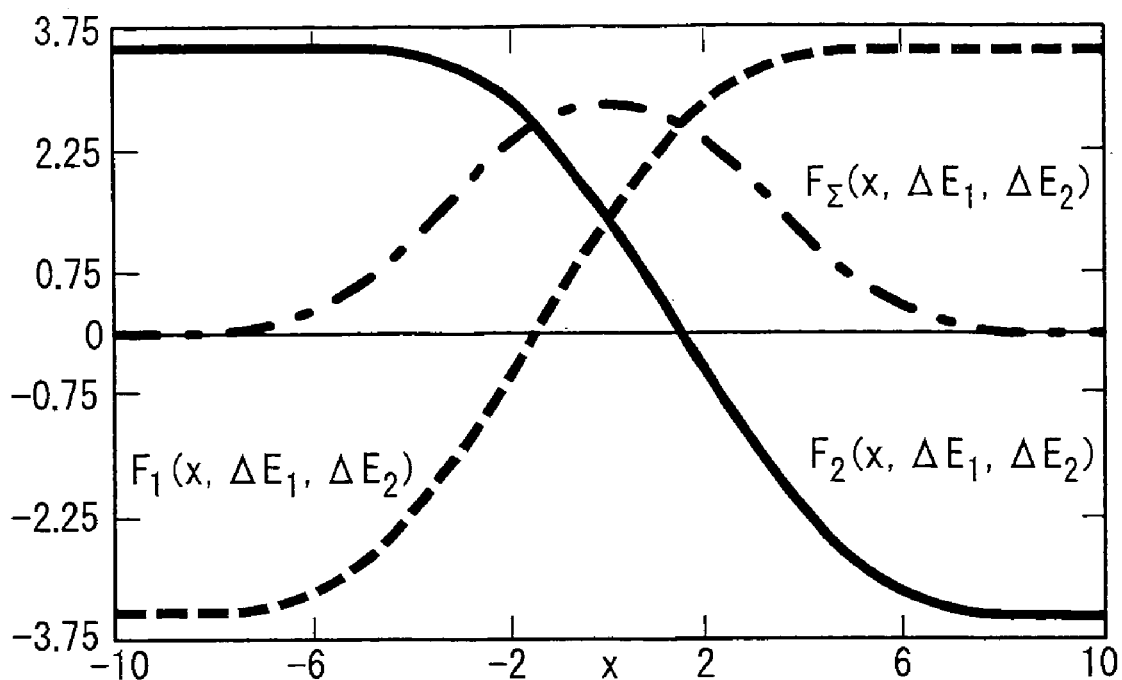
FIG. 11 is a transmission function for a nonlinear unit $F\Sigma(x, \Delta E_1, \Delta E_2)$.

FIG. 11 shows the transmission function of the nonlinear unit FS(x, $\Delta E_1$, $\Delta E_2$) in the case $\Delta E_1 = -5$ and $\Delta E_2 = -2$. As can be seen from FIG. 11, the larger the argument x, the closer FS(x, $\Delta E_1$, $\Delta E_2$) is to zero.

Here, the argument x of Equation (26) corresponds to the correlation output signal $$y\left(y \rightarrow \frac{2}{N_0} \int_0^T y(t) \, dt\right)$$

of the decision expression of Equation (25). Hence, when the S/N ratio is high (when $N_0 \rightarrow 0$ and $2/N_0 \rightarrow 8$), the function FS(x, $\Delta E_1$, $\Delta E_2$) is then equal to zero and the linear terms of Equation (25) can be approximated as follows:

$$\Delta \ln P_1(i_2) - 8 \cdot d^2/N_0 + \qquad (27)$$

$$0.25 \cdot \begin{pmatrix} \text{lncosh}\{0.5(-2\alpha \cdot d \cdot y - \Delta E_{01} + \Delta \ln P_2(i_2))\} - \\ \text{lncosh}\{0.5(-2\alpha \cdot d \cdot y - \Delta E_{45} + \Delta \ln P_2(i_2))\} + \\ \text{lncosh}\{0.5(-2\alpha \cdot d \cdot y - \Delta E_{32} - \Delta \ln P_2(i_2))\} - \\ \text{lncosh}\{0.5(-2\alpha \cdot d \cdot y - \Delta E_{76} - \Delta \ln P_2(i_2))\} + \\ \text{lncosh}\{0.5(-2\alpha \cdot d \cdot y + \Delta E_{32} + \Delta \ln P_2(i_2))\} - \\ \text{lncosh}\{0.5(-2\alpha \cdot d \cdot y + \Delta E_{76} + \Delta \ln P_2(i_2))\} + \\ \text{lncosh}\{0.5(-2\alpha \cdot d \cdot y + \Delta E_{01} - \Delta \ln P_2(i_2))\} - \\ \text{lncosh}\{0.5(-2\alpha \cdot d \cdot y + \Delta E_{45} - \Delta \ln P_2(i_2))\} \end{pmatrix} +$$

$$0.50 \cdot \begin{pmatrix} \text{lncosh}\{0.5(-4\alpha \cdot d \cdot y - \Delta E_{02} - \Delta E_{13} + \Delta \ln P_2(i_1))\} - \\ \text{lncosh}\{0.5(-4\alpha \cdot d \cdot y + \Delta E_{46} + \Delta E_{57} + \Delta \ln P_2(i_1))\} + \\ \text{lncosh}\{0.5(-4\alpha \cdot d \cdot y - \Delta E_{810} - \Delta E_{911} + \Delta \ln P_2(i_1))\} - \\ \text{lncosh}\{0.5(-4\alpha \cdot d \cdot y + \Delta E_{1412} + \Delta E_{1513} + \Delta \ln P_2(i_1))\} \end{pmatrix} \approx$$

$$\Delta \ln P_1(i_2) - 8 \cdot d^2 / N_0$$

Further, the decision expression $\Delta \ln P_1(i_2)$ is ultimately the following expression:

$$\Delta \ln P_1(i_2/y(t)) = \ln P_1(i_2 = 1) - \ln P_1(i_2 = 0) \qquad (28)$$

$$= \Delta \ln P_1(i_2) - 8 \cdot d^2 / N_0 +$$

$$\ln \left\{ \cosh \left\{ \begin{pmatrix} \Delta \ln P_1(i_1) - 6 \cdot d \cdot y + 0.5 \cdot ( \\ 0.5 \begin{vmatrix} \text{lncosh}\{0.5(-2\alpha dy - \Delta E_{01} - \Delta \ln P_2(i_2))\} - \\ \text{lncosh}\{0.5(-2\alpha dy + \Delta E_{01} - \Delta \ln P_2(i_2))\} + \\ \text{lncosh}\{0.5(-2\alpha dy - \Delta E_{32} - \Delta \ln P_2(i_2))\} - \\ \text{lncosh}\{0.5(-2\alpha dy + \Delta E_{32} + \Delta \ln P_2(i_2))\}) \end{vmatrix} + \\ \text{lncosh}\{0.5(-4\alpha \cdot d \cdot y - \Delta E_{02} - \Delta E_{13} + \Delta \ln P_2(i_1))\} - \\ \text{lncosh}\{0.5(-4\alpha \cdot d \cdot y + \Delta E_{02} + \Delta E_{13} + \Delta \ln P_2(i_1))\} \end{pmatrix} \right\} \right\} -$$

$$\ln \left\{ \cosh \left\{ \begin{pmatrix} \Delta \ln P_1(i_1) - 2 \cdot d \cdot y + 0.5 \cdot ( \\ 0.5 \begin{vmatrix} \text{lncosh}\{0.5(-2\alpha dy - \Delta E_{45} - \Delta \ln P_2(i_2))\} - \\ \text{lncosh}\{0.5(-2\alpha dy + \Delta E_{45} + \Delta \ln P_2(i_2))\} + \\ \text{lncosh}\{0.5(-2\alpha dy - \Delta E_{76} - \Delta \ln P_2(i_2))\} - \\ \text{lncosh}\{0.5(-2\alpha dy + \Delta E_{76} + \Delta \ln P_2(i_2))\}) \end{vmatrix} + \\ \text{lncosh}\{0.5(-4\alpha \cdot d \cdot y - \Delta E_{46} - \Delta E_{57} + \Delta \ln P_2(i_1))\} - \\ \text{lncosh}\{0.5(-4\alpha \cdot d \cdot y + \Delta E_{46} + \Delta E_{57} + \Delta \ln P_2(i_1))\} \end{pmatrix} \right\} \right\}$$

(F) First Channel/Second Bit $i_2$ Turbo Receiver

Figure 12:
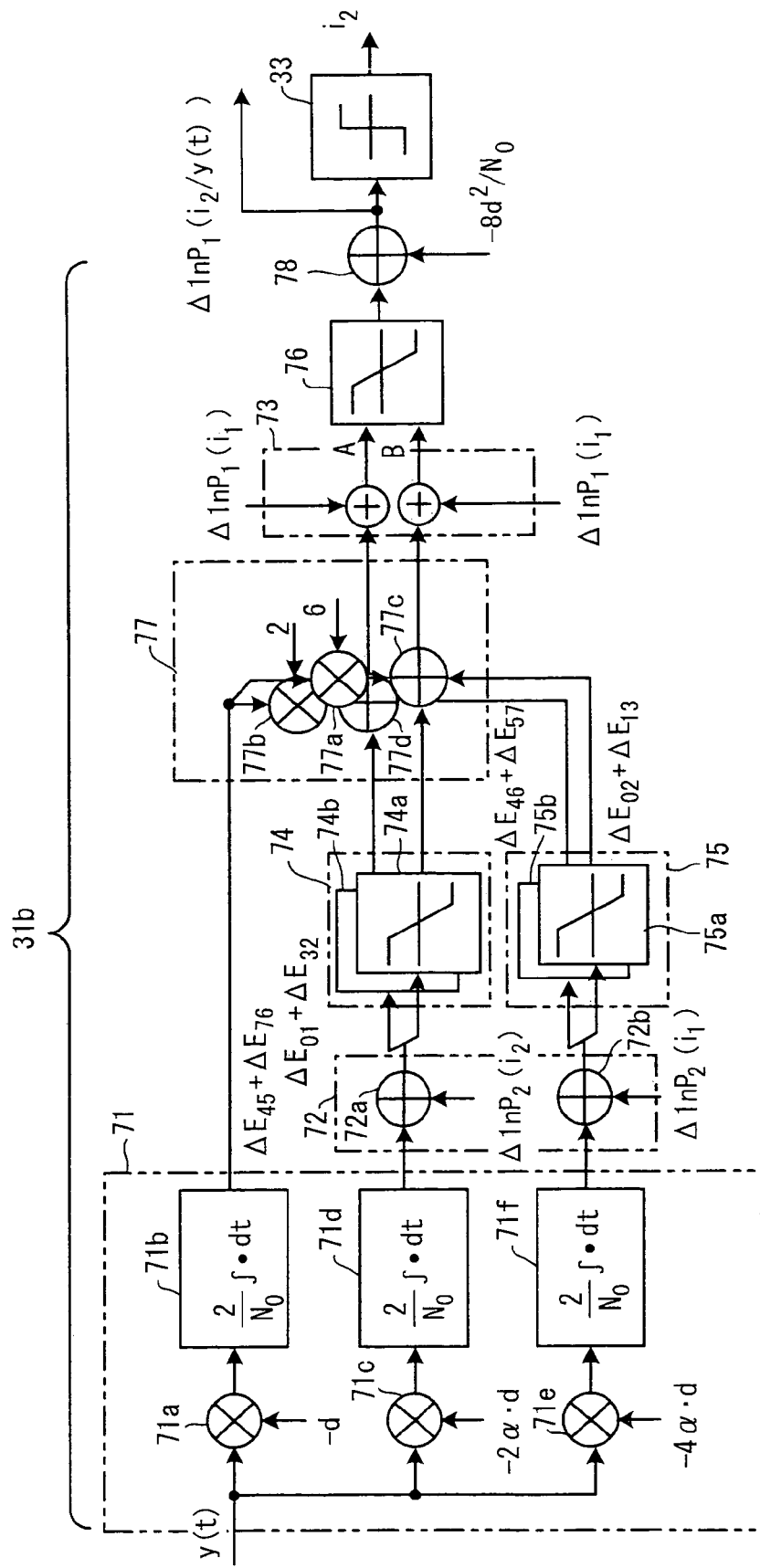
FIG. 12 is a constitutional view of the first channel/second bit receiver portion of the present invention.

FIG. 12 is a block diagram of a turbo receiver that estimates the probability $\Delta \ln P_1(i_2/y(t))$ of the second bit $i_2$ of the first channel by means of Equation (28), which, in a broad classification, is constituted by a receiver portion 31b and a symbol decision unit 33, wherein the receiver portion 31b comprises a correlation unit (may be a matched filter) 71, an other channel decision result operation unit 72, an own channel first bit decision result operation unit 73, first to third nonlinear units 74 to 76, a calculation unit 77, and an adder 78.

The first multiplication unit 71a, first integrator 71b, second multiplication unit 71c, second integrator 71d, third multiplication unit 71e and third integrator 71f of the correlation unit 71 integrate the results of multiplying the received signal y(t) by predetermined reference signals $S_0$ to $S_{15}$. The other channel decision result operation unit 72 comprises adders 72a and 72b, wherein the adder 72a adds the probability $\Delta \ln P_2(i_2)$ of the second bit of the second channel to the output signal of the second integrator 71d and the adder 72b adds the probability $\Delta \ln P_2(i_1)$ of the first bit of the second channel to the output signal of the third integrator 71f.

The first nonlinear unit 74a executes a first nonlinear calculation in the third term on the right side of Equation (28) and the other first nonlinear unit 74b executes a first nonlinear calculation in the fourth term on the right side of Equation (28). The second nonlinear unit 75a executes a first nonlinear calculation in the third term on the right side of Equation (28) and the other second nonlinear unit 75b executes a second nonlinear calculation in the fourth term on the right side of Equation (28). A multiplier 77a of the multiplication unit 77 calculates −6dy in the third term on the right side of Equation 28; an adder 77c adds −6dy, the output of the first nonlinear unit 74a and the output of the second nonlinear unit 75a; a multiplier 77b calculates −2dy in the fourth term on the right side of Equation (28); and the adder 77d adds −2dy, the output of the first nonlinear unit 74b and the output of the second nonlinear unit 75b.

The own channel decision result operation unit 73 outputs signals A and B by adding the probability $\Delta \ln P_1(i_1)$ of the first bit of the first channel to the output signal of the adders 77c and 77d. The third nonlinear unit 76 executes the nonlinear calculation ln cosh[A]+ln cosh[B], the adder 78 outputs the probability $\Delta \ln P_1(i_2/y(t))$ by adding $-8d^2/N_0$ to the output of the third nonlinear unit 76, and the symbol decision unit 33 decides whether the code of the second bit $i_2$ is "+" or "−", that is, "0" or "1", depending on whether the probability $\Delta \ln P_1(i_2/y(t))$ is greater or smaller than 0.

The probability $\Delta \ln P_1(i_2/y(t))$ is fed back to the turbo receiver portion of the first bit $i_1$ and to the turbo receiver portions of the first and second bits of the second channel. Although the first term of Equation (28) was omitted earlier on account of being small, if necessary, the adder 78 can be constituted such that $\Delta \ln P_1(i_2) - 8d^2/N_0$ is added instead of $-8d^2/N_0$.

Further, the constitution of FIG. 12 can also be used when receiving the second bit $q_2$ of the Quadrature component of the first channel. The constitution of FIG. 12 can also be used when receiving the second bits $i_2$ and $q_2$ of the common mode component and Quadrature component of the second channel respectively.

(G) Overall Constitution of Turbo Receiver Portion

Figure 13:
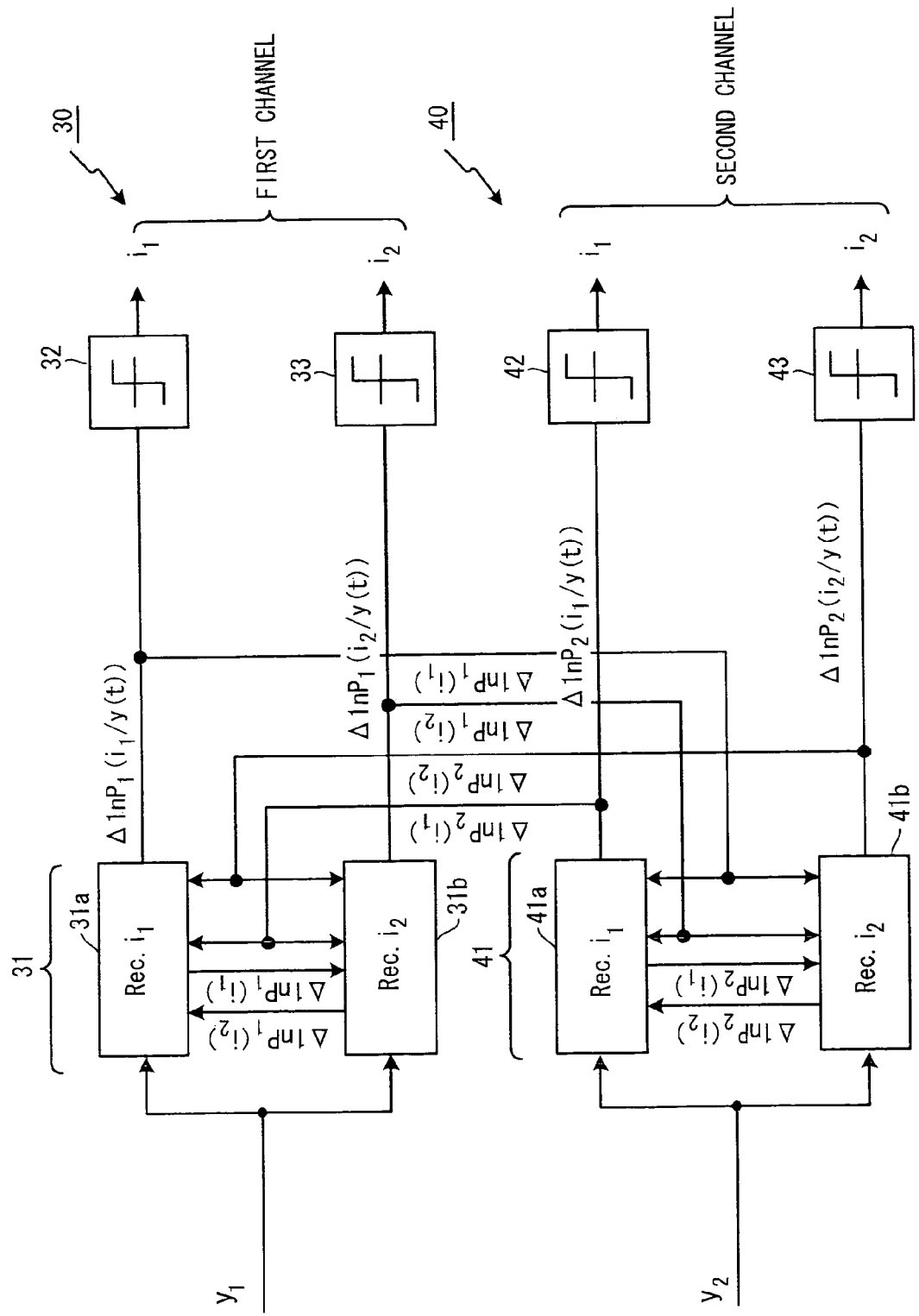
FIG. 13 is a constitutional view of the receivers of the first and second channels.

FIG. 13 is a constitutional view of the receiver of the first and second channels in which the same numerals are assigned to the same parts as in FIGS. 7, 10, and 12. The receiver unit 30 of the first channel and the receiver unit 40 of the second channel have the same constitution. That is, the first channel/first bit turbo receiver portion (31a, 32) and the second channel/first bit turbo receiver portion (41a, 42) have the same constitution. Further, the first channel/second bit turbo receiver portion (31b, 33) and second channel/second bit turbo receiver portion (41b, 43) have the same constitution.

The first channel/first bit turbo receiver portion 31a estimates the first channel/first bit probability $\Delta \ln P_1(i_1/y(t))$ by using the first channel/second bit probability $\Delta \ln P_1(i_2)$ and the probabilities $\Delta \ln P_2(i_1)$ and $\Delta \ln P_2(i_2)$ of the first and second bits of the second channel respectively and the symbol decision unit 32 judges the first channel/first bit on the basis of the probability $\Delta \ln P_1(i_1/y(t))$.

The first channel/second bit turbo receiver 31b estimates the first channel/second bit probability $\Delta \ln P_1(i_2/y(t))$ by using the first channel/first bit probability $\Delta \ln P_1(i_1)$ and the probabilities $\Delta \ln P_2(i_1)$ and $\Delta \ln P_2(i_2)$ of the first and second bits of the second channel respectively and the symbol decision unit 33 judges the first channel/second bit on the basis of the probability $\Delta \ln P_1(i_2/y(t))$.

Likewise, the second channel/first bit turbo receiver portion 41a estimates the second channel/first bit probability $\Delta \ln P_2(i_1/y(t))$ by using the second channel/second bit probability $\Delta \ln P_2(i_2)$ and the probabilities $\Delta \ln P_1(i_1)$ and $\Delta \ln P_1(i_2)$ of the first and second bits of the first channel respectively and the symbol decision unit 42 judges the second channel/first bit on the basis of the probability $\Delta \ln P_2(i_1/y(t))$.

The second channel/second bit turbo receiver portion 41b estimates the second channel/second bit probability $\Delta \ln P_2(i_2/y(t))$ by using the second channel/first bit probability $\Delta \ln P_2(i_1)$ and the probabilities $\Delta \ln P_1(i_1)$ and $\Delta \ln P_1(i_2)$ of the first and second bits of the first channel respectively and the symbol decision unit 43 judges the second channel/second bit on the basis of the probability $\Delta \ln P_2(i_2/y(t))$.

Although the demodulation of the first and second bits of an in-phase component were described earlier, the first and second bits of a Quadrature component can also be demodulated and outputted by means of the same constitution.

(H) Turbo Algorithm

Equations (13) and (28) define the constitution of the optimal receiver for a 16 QAM signal with ICI. As can be seen from Equations (13) and (28), when the codes of the transmitted first and second bits are determined, decision information (prior probability logarithm difference) that was created beforehand for the first and second bits $i_1$ and $i_2$ respectively and decision information of the adjacent channel are employed. In equation (13), which is a decision expression for the first channel, this information is $\Delta \ln P_1(i_1)$, $\Delta \ln P_2(i_2)$, and $\Delta \ln P_2(i_1)$, which denote the logarithm difference of the posterior probability (soft decision) of whether the codes of the transmitted bits of the first and second channels are "+" or "–". Because all the calculations are performed serially, iterative counting to adopt the latest posterior probability from the first and second channels is possible during the processing according to Equation (13). The turbo connection between the two-channel soft decisions is as shown in FIG. 13.

The proposed algorithm is analogous to the turbo decoder method of M. C. Valeniti and B. D. Woerner, "Variable latency turbo codes for wireless multimedia applications," Proc, Int. Symposium on Turbo codes and Related Topics., Brest, France, September 1997, pp 216-219, which was designed for turbo codes.

Due to the similarity with the turbo decoder, the algorithm of the present invention shall be called a turbo receiver. The well-known Viterbi phrase that information that is beneficial to a decision is not discarded at all until all decisions are complete is extremely good and suited to the turbo receiver of the present invention.

Because all the calculations are performed sequentially for each channel, iterative counting that adopts the latest posterior probability estimation values from the adjacent channel is performed. In the turbo decoder, each decoder passes information to the other decoder and then closely examines the posterior probabilities that are estimated sequentially by using information that is derived from the other decoder. Likewise, with the algorithm of the present invention, information that is derived following nonlinear processing from the first subchannel is used to examine closely the estimated posterior probability of the second channel, while information that is derived from the second channel is similarly used to examine closely the estimated posterior probability of the first channel. As in the case of an iterative turbo decoder, the algorithm of the present invention performs one or more iterations before making a final decision with respect to a received information symbol. If, in the case of a turbo receiver, individual decoder outputs are in the hard bit decision (hard decision) format, there is only a slight benefit to be derived from sharing the information. The hard bit decision is analogous to the decision feedback equalizer proposed for the purpose of ICI cancellation by Viterbi and Fazel in Viterbi and K. Fazel, "How to combat long echoes in OFDM transmission schemes: Subchannel equalization or more powerful channel coding," Proc. IEEE Globecom '95, Singapore, November 1995, pp. 2069-2074. However, according to the present invention, the hard bit decision is performed only in the final iteration.

This structural similarity exists for the following reason. That is, with a turbo receiver, as in the case of turbo codes, the same information is transmitted on a subchannel with non-correlative noise due to the existence of ICI. The estimation of the posterior probability (or reliability of the determination) can be improved by using the estimated posterior probability derived from the other subchannel in accordance with the handling of this non-correlative noise.

As per an iterative turbo decoder, the algorithm of the present invention performs one or more iterations before making the final decision with respect to the received information. Further, in the initial first channel/first bit step, that is, when the decision result for the second bit of the first channel and the decision result for the first and second bits from the second channel cannot be used, if the data is a probability variable with a uniform distribution, the probabilities can be established, for the first channel, as:

$$P_1(i_2=+1/y(t))=\tfrac{1}{2},\ P_1(i_2=0/y(t))=\tfrac{1}{2}$$

$$P_2(i_1=+1/y(t))=\tfrac{1}{2},\ P_2(i_1=0/y(t))=\tfrac{1}{2}$$

$$P_2(i_2=+1/y(t))=\tfrac{1}{2},\ P_2(i_2=0/y(t))=\tfrac{1}{2}.$$

These settings are the optimum settings. Hence, in the first step of the first channel, suppose that the differences between posterior probabilities $\Delta \ln P_1(i_2)$, $\Delta \ln P_2(i_1)$ and $\Delta \ln P_2(i_2)$ of Equation (13) are zero. The calculation of Equation (13) based on the assumption that $\Delta \ln P_1(i_2)=0$, $\Delta \ln P_2(i_1)=0$ and $\Delta \ln P_2(i_2)=0$ provides an initial estimate for $\Delta \ln P_1(i_1)$ and $\Delta \ln P_1(i_2)$, which are the estimation targets for the first channel. Likewise, according to the algorithm of Equation (28) of the present invention, the second channel adopts the posterior probabilities $\Delta \ln P_1(i_1)=0$ and $\Delta \ln P_1(i_2)=0$ during the initial iteration. In the second step, in order to calculate the new estimation posterior probabilities $\Delta \ln P_1(i_1)$ and $\Delta \ln P_1(i_2)$ for the first channel, the values of $\Delta \ln P_2(i_1)$ and $\Delta \ln P_2(i_2)$ obtained in the previous step must be applied to Equation (28), which is the decision expression. In accordance with this method, the output of a channel receiver is used as the prior probability of the other receiver.

(I) Simulation Results

Figure 14:
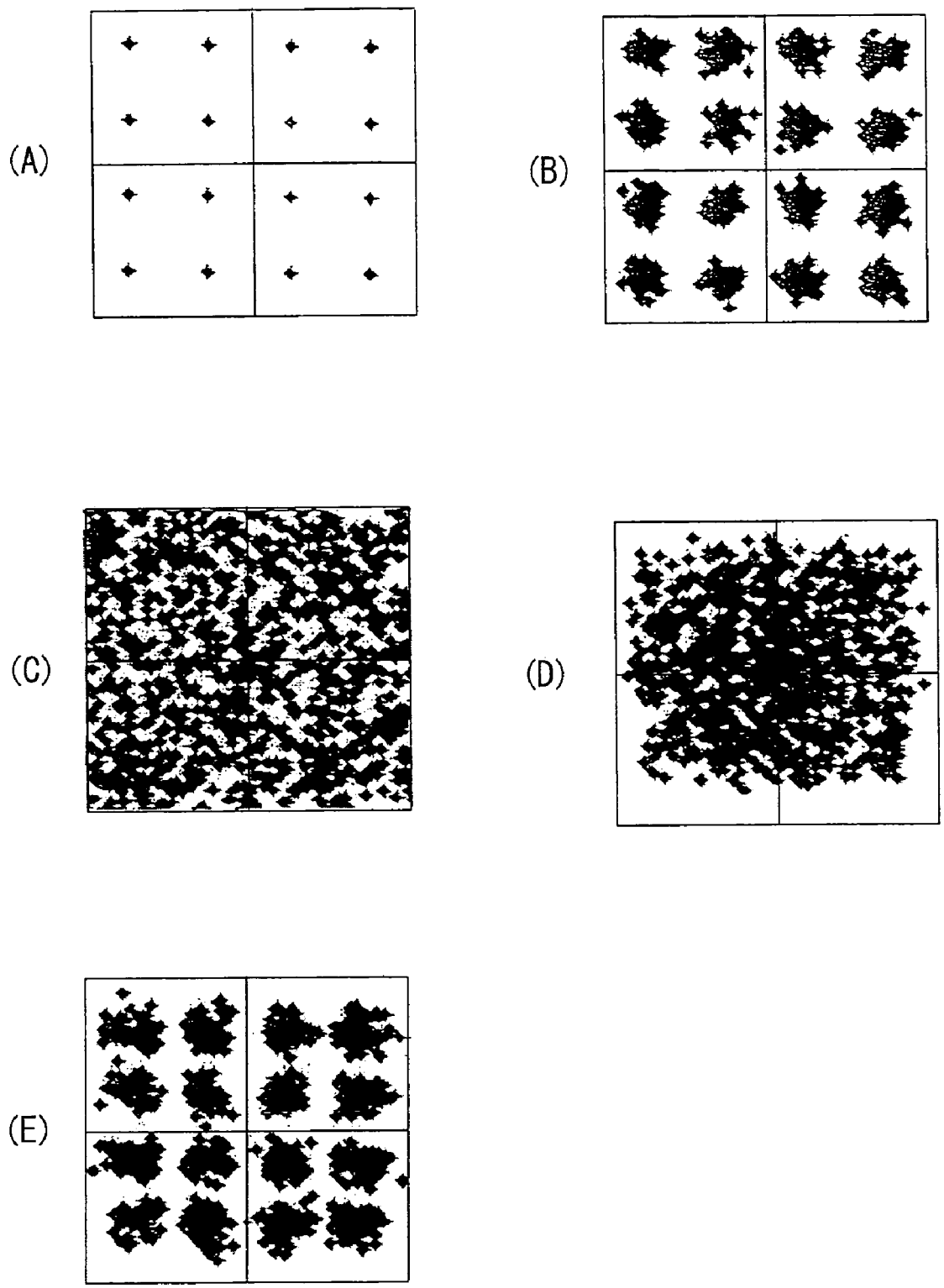
FIG. 14 is an explanatory diagram of constellations of the first channel with different points of the communication system shown in FIG. 7.

FIG. 14 is an explanatory diagram of constellations of the first channel with different points of the communication system shown in FIG. 7 where 16 QAM is adopted and the S/N ratio=10 dB. Further, the cross-channel leak coefficients are $\alpha_{21}=0.25$ and $\alpha_{12}=0.25$. (A) is a constellation of the original 16 QAM signal; (B) is a constellation of an ICI-free 16 QAM signal with noise where S/N ratio=10 dB; (C) is a constellation of the received signal (16 QAM signal that has deteriorated due to noise); (D) is a constellation of the initial 16 QAM signal of the present invention; and (E) is a constellation of a 16 QAM signal that has undergone two turbo iterations.

It is clear from an analysis of (B), (C), and (D) that the effects of ICI decrease following the turbo processing of the present invention. That is, the constellation that has undergone two turbo iterations (see E) is extremely close to ICI-free transmission (see B) that has deteriorated only due to Gaussian noise.

As detailed earlier, the receiver of the present invention adopts a nonlinear unit and crossfeed in order to improve the estimation of the posterior probability. This constitution signifies that, though not impossible, an analysis of the BER performance is extremely difficult. Hence, a computer simulation was carried out in order to demonstrate that the nonlinear signal processing of the present invention was superior to that of a classical matched filter receiver.

Figure 15:
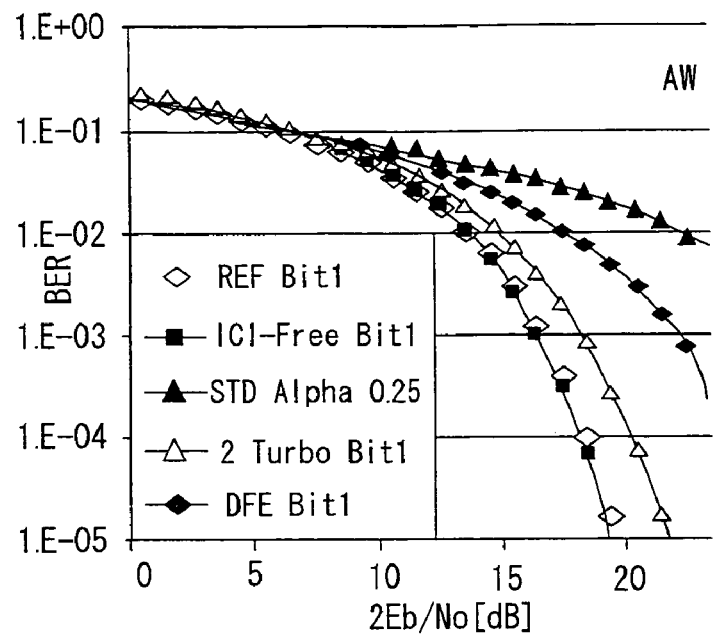
FIG. 15 shows the results of a simulation in which the average BER performance of the first bit $i_1$ of the receiver of the present invention is shown as the function 2Eb/No.
Figure 16:
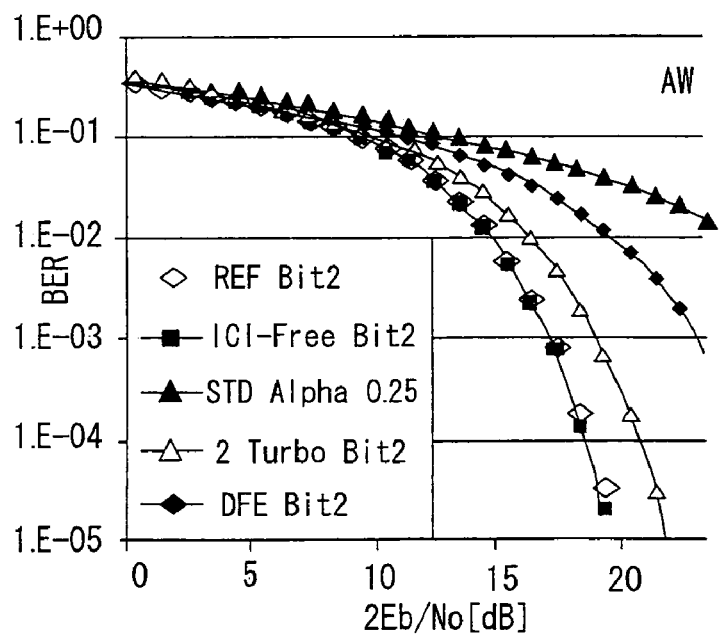
FIG. 16 shows the results of a simulation in which the average BER performance of the first bit $i_2$ of the receiver of the present invention is shown as the function 2Eb/No.

FIGS. 15 and 16 show the average BER performance (written as 2Turbo) of the first bit $i_1$ and second bit $i_2$ of the receiver of the present invention as the function $2E_b/N_0$ based on Equations (13) and (28) respectively. $E_b/N_0$ is the ratio between the background noise power spectral intensity $N_0$ per bit and the average received signal energy $E_b$. The performance in each case is the result of 16 QAM transmission via an AWGN channel in a case where $\alpha_1=\alpha_2=0.25$. 2Turbo is the result of the present invention following two turbo iterations. By way of reference, the results of a simulation (ICI-free) in a case where no ICI exists and $\alpha_{12}=\alpha_{21}=0$ are shown in FIGS. 15 and 16. As a further reference, the results of a BER simulation (written as REF) when the ICI of a matched filter receiver calculated by using the formula of Equation (29) does not exist are shown.

$$BER(i_1) = \frac{1}{2}\left(Q\left(\sqrt{\frac{E_0}{5N_0}}\right) + Q\left(3\sqrt{\frac{E_0}{5N_0}}\right)\right), \quad (29)$$

$$BER(i_2) = Q\left(\sqrt{\frac{E_0}{5N_0}}\right)$$

$$\text{where } Q(x) = \frac{1}{\sigma\sqrt{2\pi}}\int_x^\infty e^{-\frac{y^2}{2\sigma^2}} dt$$

The BER performance that is obtained by means of the computer simulation of the present invention and the BER performance that is calculated by means of Equation (29) are a reasonable match. Further, as is evident from the plots of FIGS. 15 and 16, if ICI does not exist, the BER of the receiver of the present invention is no different from the BER obtained by means of Equation (29) of a conventional matched filter base receiver. Further, when ICI exists (when $\alpha_1=\alpha_2=0.25$), a conventional device that executes nonlinear processing exhibits an inferior equivalence performance to that of the receiver of the present invention based on the simulation results (shown as STD Alpha 0.25) and the simulation results reveal that this inferiority is particularly marked in the event of a high $E_b/N_0$.

In recent years, a great number of methods have come to be developed to reduce sensitivity to ICI. For the sake of a fair comparison, DFEs (Decision Feedback Equalizers) of equal complexity are chosen as possible alternate methods and shown in FIGS. 15 and 16 for the purpose of referencing simulation results of methods based on DFE (written as DFE).

(J) Conclusion

The effects of ICI in two adjacent channels of a multicarrier communication system that adopts the 16 QAM modulation method were investigated above. The performance of the conventional receiver deteriorates very quickly as the coupling between the adjacent channels increases. This increases the BER of a non-coding system or coding system.

A bit-wise receiver based on posterior probability estimation was handled synthetically by using a Karkov chain approximation. The receiver of the present invention is a receiver based on the estimated posterior probability. This receiver is a turbo receiver in which the receiver of each subchannel passes information to the receiver of the adjacent subchannel and sequentially refines the posterior probability that is estimated using information derived from the receiver of the adjacent subchannel.

Therefore, the turbo receiver of the present invention can substantially improve BER performance in comparison with a conventional matched filter receiver. This is because the nonlinear signal processing uses information that is obtained on the adjacent channel to maximize the posterior probability. In addition, the present invention executes a DFE equalizer that is widely used in order to cancel ICI by means of intelligent feedback. The largest BER improvement is produced in a high S/N ratio area where ICI governs Gaussian noise. According to the simulation results, the turbo receiver of the present invention is able to achieve a favorable performance over a substantially wide range of ICI coupling coefficients.

Although described for QPSK (16-value QAM) of multi-value QAM, the present invention is not limited to sixteen values.

(K) Appendix A

The following is introduced to Equation (11) in order to simplify each of the elements:

$\ln P_1(11) - \ln P_1(10) = \ln P_1(i_1=1) + \ln P_1(i_2=1) - \ln P_1(i_1=1) - \ln P_1(i_2=0) = \Delta \ln P_1(i_2)$ $\ln P_1(01) - \ln P_1(00) = \ln P_1(i_1=0) + \ln P_1(i_2=1) - \ln P_1(i_1=0) - \ln P_1(i_2=0) = \Delta \ln P_1(i_2)$ $\ln P_1(11) + \ln P_1(10) - \ln P_1(01) - \ln P_1(00) = \ln P_1(11) - \ln P_1(01) + \ln P_1(10) - \ln P_1(00) = 2\Delta P_1(i_1)$ $\ln P_2(11) - \ln P_2(10) = \ln P_2(i_1=1) + \ln P_2(i_2=1) - \ln P_2(i_1=1) - \ln P_2(i_2=0) = \Delta \ln P_1(i_2)$ $\ln P_2(01) - \ln P_2(00) = \ln P_2(i_1=0) + \ln P_2(i_2=1) - \ln P_2(i_1=0) - \ln P_2(i_2=0) = \Delta \ln P_2(i_2)$ $\ln P_2(11) + \ln P_2(10) - \ln P_2(01) - \ln P_2(00) = \ln P_2(11) - \ln P_2(01) + \ln P_2(10) - \ln P_2(00) = 2\Delta P_2(i_1)$ $\ln P_2(11) - \ln P_2(01) = \ln P_2(i_1=1) + \ln P_2(i_2=1) - \ln P_2(i_1=0) - \ln P_2(i_2=1) = \Delta \ln P_2(i_1)$ $\ln P_2(10) - \ln P_2(00) = \ln P_2(i_1=1) + \ln P_2(i_2=0) - \ln P_2(i_1=0) - \ln P_2(i_2=0) = \Delta \ln P_2(i_1)$ When the common terms are removed, the following equation is established from Equation (2):

$$\ln P(S_j/y(t)) = \frac{2}{N_0} \int_0^T y(t) \cdot S_j(t)\, dt - \frac{E_j}{N_0} \quad (j = 0, 1, 2, \ldots 15)$$

where $E_j$ is the energy of signal $S_j$, such that:

$$E_j = \int_0^T S_j(t)^2\, dt$$

If, in order to simplify the notation, y is introduced as follows:

$$y \rightarrow \frac{2}{N_0} \int_0^T y(t)\, dt,$$

the result is:

$$\ln P(S_j/y(t)) = \ln P(S_j) = y \cdot S_j(t) - \frac{E_j}{N_0} \qquad \text{A(0)}$$

In accordance with the new notation $i_1=1$, the second term in Equation (12) becomes:

$\ln \{P(S_0) \cdot P_2(11) + P(S_1) \cdot P_2(10) + P(S_2) \cdot P_2(01) + P(S_3) \cdot P_2(00)\} = 0.25\{ \ln P(S_0) + \ln P(S_1) + \ln P(S_2) + \ln P(S_3) + (\ln P_2(11) + \ln P_2(10) + \ln P_2(01) + \ln P_2(00))\} + 0.5(\ln \cosh\{0.5(\ln P(S_0) - \ln P(S_1) + \Delta \ln P_2(i_2))\} + \ln \cosh\{0.5(\ln P(S_2) - \ln P(S_3) + \Delta \ln P_2(i_2))\}) + \ln \cosh\{0.25(\ln P(S_0) + \ln P(S_1) - \ln P(S_2) - \ln P(S_3) + 2\Delta \ln P_2(i_1))\}$ The following equation is obtained from Equation A(0) and Table 2:

$\ln P(S_0) + \ln P(S_1) + \ln P(S_2) + \ln P(S_3) = -12 \cdot d \cdot y - (36 + 20\alpha^2) \cdot d^2/N_0$ $\ln P(S_0) - \ln P(S_1) = -2\alpha \cdot d \cdot y - (12\alpha + 8\alpha^2) \cdot d^2/N_0$ $\ln P(S_2) - \ln P(S_3) = -2\alpha \cdot d \cdot y - (12\alpha - 8\alpha^2) \cdot d^2/N_0$ $\ln P(S_0) + \ln P(S_1) - \ln P(S_2) - \ln P(S_3) = -8\alpha \cdot d \cdot y - 48\alpha \cdot d^2/N_0$ and, finally, the following equation is obtained:

$$\ln\{P(S_0) \cdot P_2(11) + P(S_1) \cdot P_2(10) + P(S_2) \cdot P_2(01) + P(S_3) \cdot P_2(00)\} = \qquad \text{A(1)}$$

$$0.25\{-12 \cdot d \cdot y - (36 + 20\alpha^2) \cdot d^2/N_0 +$$

$$(\ln P_2(11) + \ln P_2(10) + \ln P_2(01) + \ln P_2(00))\} +$$

$$0.5 \left( \begin{array}{l} \ln\cosh\{0.5(-2\alpha \cdot d \cdot y - (12\alpha + 8\alpha^2) \cdot d^2/N_0 + \Delta \ln P_2(i_2))\} + \\ \ln\cosh\{0.5(-2\alpha \cdot d \cdot y - (12\alpha + 8\alpha^2) \cdot d^2/N_0 + \Delta \ln P_2(i_2))\} \end{array} \right) +$$

$$\ln\cosh\{0.25(-8\alpha \cdot d \cdot y - 48\alpha \cdot d^2 + 2\Delta \ln P_2(i_2))\}$$

Likewise, as a result of the new notation $i_1=1$, the third item of Equation (12) becomes:

$\ln \{P(S_4) \cdot P_2(11) + P(S_5) \cdot P_2(10) + P(S_6) P_2(01) + P(S_7) \cdot P_2(00)\} = 0.25\{ \ln P(S_4) + \ln P(S_5) + \ln P(S_6) + \ln P(S_7) + (\ln P_2(11) + \ln P_2(10) + \ln P_2(01) + \ln P_2(00))\} + 0.5(\ln \cosh\{0.5(\ln P(S_4) - \ln P(S_5) + \Delta \ln P_2(i_2))\} + \ln \cosh\{0.5(\ln P(S_6) - \ln P(S_7) + \Delta \ln_2 P(i_2))\}) + \ln \cosh\{0.25(\ln P(S_4) + \ln P(S_5) - \ln P(S_6) - \ln P(S_7) + 2\Delta \ln P_2(i_1))\}$ The following equation is obtained from Equation A(0) and Table 2.

$\ln P(S_4) + \ln P(S_5) + \ln P(S_6) + \ln P(S_7) = -4 \cdot d \cdot y - (4 + 20\alpha) \cdot d^2/N_0$ $\ln P(S_4) - \ln P(S_5) = -2\alpha \cdot d \cdot y - (4\alpha + 8\alpha^2) \cdot d^2/N_0$ $\ln P(S_6) - \ln P(S_7) = -2\alpha \cdot d \cdot y - (4\alpha - 8\alpha^2) \cdot d^2/N_0$ $\ln P(S_4) + \ln P(S_6) - \ln P(S_7) - \ln P(S_8) = -8\alpha \cdot d \cdot y - 16\alpha \cdot d^2/N_0$ Finally, the following equation is obtained:

$$\ln\{P(S_4) \cdot P_2(11) + P(S_5) \cdot P_2(10) + P(S_6) \cdot P_2(01) + P(S_7) \cdot P_2(00)\} = \qquad \text{A(2)}$$

$$0.25\{-4 \cdot d \cdot y - (4 + 20\alpha^2) \cdot d^2/N_0 + (\ln P(11) + \ln P(10) + \ln P_2(01) + \ln P_2(00))\} +$$

$$0.5 \left( \begin{array}{l} \ln\cosh\{0.5(-2\alpha \cdot d \cdot y - (4\alpha + 8\alpha^2) \cdot d^2/N_0 + \Delta \ln P_2(i_2))\} + \\ \ln\cosh\{0.5(-2\alpha \cdot d \cdot y - (4\alpha - 8\alpha^2) \cdot d^2/N_0 + \Delta \ln P_2(i_2))\} \end{array} \right) +$$

$$\ln\cosh\{0.25(-8\alpha \cdot d \cdot y - 16\alpha \cdot d^2/N_0 + 2\Delta \ln P_2(i_1))\}$$

Similarly, in accordance with the new notation $i_2=0$, the fourth term of Equation(12) becomes:

$$\ln\{P(S_8)\cdot P_2(11)+P(S_9)\cdot P_2(10)+P(S_{10})\cdot P_2(01)+P(S_{11})\cdot P_2(00)\}=0.25\{\ln P(S_8)+\ln P(S_9)+\ln P(S_{10})+\ln P(S_{11})+(\ln P_2(11)+\ln P_2(10)+\ln P_2(01)+\ln P_2(00))\}+0.5(\ln cosh\{0.5(\ln P(S_8)-\ln P(S_9)+\Delta \ln P_2(i_2))\}+\ln cosh\{0.5(\ln P(S_{10})-\ln P(S_{11})+\Delta \ln P_2(i_2))\})+\ln cosh\{0.25(\ln P(S_8)+\ln P(S_9)-\ln P(S_{10})-\ln P(S_{11})+2\Delta \ln P_2(i_1))\}$$

The following equation is obtained from Equation A(0) and Table 2.

$$\ln P(S_8)+\ln P(S_9)+\ln P(S_{10})+\ln P(S_{11})=-12\cdot d\cdot y-(36+20\alpha)\cdot d^2/N_0$$

$$\ln P(S_8)-\ln P(S_9)=-2\alpha\cdot d\cdot y+(12\alpha-8\alpha^2)\cdot d^2/N_0$$

$$\ln P(S_{10})-\ln P(S_{11})=-2\alpha\cdot d\cdot y+(12\alpha+8\alpha^2)\cdot d^2/N_0$$

$$\ln P(S_8)+\ln P(S_9)-\ln P(S_{10})-\ln P(S_{11})=-8\alpha\cdot d\cdot y+48\alpha\cdot d^2/N_0$$

Finally, the following equation is obtained:

$$\ln\{P(S_8)\cdot P_2(11)+P(S_9)\cdot P_2(10)+P(S_{10})\cdot P_2(01)+P(S_{11})\cdot P_2(00)\}=$$
$$0.25\{-12\cdot d\cdot y-(36+20\alpha^2)\cdot d^2/N_0+(\ln P(11)+\ln P(10)+\ln P_2(01)+\ln P_2(00))\}+$$
$$0.5\begin{pmatrix}\text{lncosh}\{0.5(-2\alpha\cdot d\cdot y+(12\alpha-8\alpha^2)\cdot d^2/N_0+\Delta\ln P_2(i_2))\}+\\ \text{lncosh}\{0.5(-2\alpha\cdot d\cdot y+(12\alpha+8\alpha^2)\cdot d^2/N_0+\Delta\ln P_2(i_2))\}\end{pmatrix}+$$
$$\text{lncosh}\{0.25(-8\alpha\cdot d\cdot y+48\alpha\cdot d^2+2\Delta\ln P_2(i_1))\} \qquad A(3)$$

Likewise, in accordance with the new notation $i_2=0$, the fifth term in Equation (12) becomes:

$$\ln\{P(S_{12})\cdot P_2(11)+P(S_{13})\cdot P_2(10)+P(S_{14})\cdot P_2(01)+P(S_{15})\cdot P_2(00)\}=0.25\{\ln P(S_{12})+\ln P(S_{13})+\ln P(S_{14})+\ln P(S_{15})+(\ln P_2(11)+\ln P_2(01)+\ln P_2(00))\}+0.5(\ln cosh\{0.5(\ln P(S_{12})-\ln P(S_{13})+\Delta \ln P_2(i_2))\}+\ln cosh\{0.5(\ln P(S_{14})-\ln P(S_{15})+\Delta \ln P_2(i_2))\})+\ln cosh\{0.25(\ln P(S_{12})+\ln P(S_{13})-\ln P(S_{14})-\ln P(S_{14})+2\Delta \ln P_2(i_1))\}$$

The following equation is obtained from Equation A(0) and Table 2:

$$\ln P(S_{12})+\ln P(S_{13})+\ln P(S_{14})+\ln P(S_{15})=4\cdot d\cdot y-(4+20\alpha)\cdot d^2/N_0$$

$$\ln P(S_{12})-\ln P(S_{13})=-2\alpha\cdot d\cdot y+(4\alpha-8\alpha^2)-d^2/N_0$$

$$\ln P(S_{14})-\ln P(S_{15})=-2\alpha\cdot d\cdot y+(4\alpha+8\alpha^2)\cdot d^2/N_0$$

$$\ln P(S_{12})+\ln P(S_{13})-\ln P(S_{14})-\ln P(S_{15})=2\cdot y(t)/N_0\cdot(-8\alpha\cdot d)+16\alpha\cdot d^2/N_0$$

Finally, the following equation is obtained:

$$\ln\{P(S_{12})\cdot P_2(11)+P(S_{13})\cdot P_2(10)+P(S_{14})\cdot P_2(01)+P(S_{15})\cdot P_2(00)\}= \qquad A(4)$$
$$0.25\{4\cdot d\cdot y-(4+20\alpha^2)\cdot d^2/N_0+(\ln P(11)+\ln P(10)+\ln P_2(01)+\ln P_2(00))\}+$$
$$0.5\begin{pmatrix}\text{lncosh}\{0.5(-2\alpha\cdot d\cdot y+(4\alpha-8\alpha^2)\cdot d^2/N_0+\Delta\ln P_2(i_2))\}+\\ \text{lncosh}\{0.5(-2\alpha\cdot d\cdot y+(4\alpha+8\alpha^2)\cdot d^2/N_0+\Delta\ln P_2(i_2))\}\end{pmatrix}+$$
$$\text{lncosh}\{0.25(-8\alpha\cdot d\cdot y+16\alpha\cdot d^2+2\Delta\ln P(i_1))\}$$

In order to simplify excessive complexity and calculations, the following higher-order nonlinear elements in Equations (10) and (11)

$$\text{lncosh}\left\{0.5\cdot\begin{pmatrix}\ln P_1(11)-\ln P_1(10)+\\ \begin{bmatrix}\ln(P(S_0)P_2(11)+P(S_1)P_2(10)+\\ P(S_2)P_2(01)+P(S_3)P_2(00))-\\ \ln(P(S_4)P_2(11)+P(S_5)P_2(10)+\\ P(S_6)P_2(01)+P(S_7)P_2(00))\end{bmatrix}\end{pmatrix}\right\} \qquad A(5)$$

and $$\text{lncosh}\left\{0.5\cdot\begin{pmatrix}\ln P_1(01)-\ln P_1(00)+\\ \begin{bmatrix}\ln(P(S_8)P_2(11)+P(S_9)P_2(10)+\\ P(S_{10})P_2(01)+P(S_{11})P_2(00))-\\ \ln(P(S_{12})P_2(11)+P(S_{13})P_2(10)+\\ P(S_{14})P_2(01)+P(S_{15})P_2(00))\end{bmatrix}\end{pmatrix}\right\} \qquad A(6)$$

were not considered. In order to compensate for this, scaling (weighting) 0.25 was added to both nonlinear elements. The simulation results show that this operation did not cause SNR deterioration (deterioration of 0.5 dB or more) for BER. Finally, Equations A(5) and A(6) are approximated by means of each of the following equations.

$$\text{lncosh}\left\{0.5\cdot\begin{pmatrix}\ln P_1(11)-\ln P_1(10)+\\ \begin{bmatrix}\ln(P(S_0)P_2(11)+P(S_1)P_2(10)+\\ P(S_2)P_2(01)+P(S_3)P_2(00))-\\ \ln(P(S_4)P_2(11)+P(S_5)P_2(10)+\\ P(S_6)P_2(01)+P(S_7)P_2(00))\end{bmatrix}\end{pmatrix}\right\}\approx \qquad A(7)$$

$$0.25\cdot\text{lncosh}\{0.5(-2\cdot\alpha\cdot d\cdot y-8\cdot d^2/N_0+\Delta\ln P_1(i_2))\}$$

-continued $$\text{lncosh}\left\{0.5 \cdot \begin{pmatrix} \ln P_1(11) - \ln P_1(10) + \\ \ln(P(S_0)P(11) + P(S_1)P(10) + \\ P(S_2)P(01) + P(S_3)P(00)) - \\ \ln(P(S_4)P(11) + P(S_5)P(10) + \\ P(S_6)P(01) + P(S_7)P(00)) \end{pmatrix}\right\} \approx \quad A(8)$$

$$0.25 \cdot \text{lncosh}\{0.5(-2 \cdot \alpha \cdot d \cdot y + 8 \cdot d^2 / N_0 + \Delta \ln P_1(i_2))\}$$

As many apparently widely different embodiments of the present invention can be made without departing from the spirit and scope thereof, it is to be understood that the invention is not limited to the specific embodiments thereof except as defined in the appended claims.

What is claimed is:

1. A communication system that sends and receives signals via two adjacent channels in which interchannel interference exists, comprising:
   a transmitter device that transmits data of one unit which consists of a plurality of bits constituting an in-phase component that has been obtained by multi-value QAM modulation, from one channel, and transmits data of one unit which consists of a plurality of bits constituting a quadrature component that has been obtained by the multi-value QAM modulation, from other channel;
   a receiver device provided in each channel that generates a soft decision target value for each of a plurality of received bits inputted from the corresponding channel and makes a soft decision with respect to the plurality of received bits by using the respective soft decision target values; and
   means for inputting the soft decision target values of the plurality of received bits of the receiver device of one channel to the receiver device of the other channel,
   wherein the receiver device adjusts the respective soft decision target values of its own channel by using the respective soft decision target values of the plurality of bits inputted from the receiver device of the other channel and makes a decision with respect to the received bits on the basis of the soft decision target values.

2. The communication system according to claim 1, wherein the receiver device comprises:
   a soft decision target value generation unit provided in correspondence with each of the plurality of received bits that generates soft decision target values that correspond with each of the received bits; and
   a soft decision unit that makes a soft decision with respect to the plurality of received bits by using the respective soft decision target values,
   wherein the soft decision target value generation unit adjusts its own soft decision target values by using soft decision target values that are inputted from the receiver device of the other channel.

3. The communication system according to claim 1, wherein the receiver device comprises:
   a soft decision target value generation unit provided in correspondence with each of the plurality of received bits that generates soft decision target values that correspond with each of the received bits; and
   a soft decision unit that makes a soft decision with respect to the plurality of received bits by using the respective soft decision target values,
   wherein the soft decision target value generation unit comprises:
   means for adjusting the soft decision target value of bits of interest by using soft decision target values that are inputted from the receiver device of the other channel; and
   means for adjusting the soft decision target values of the bits of interest by using soft decision target values of the other bits excluding the bits of interest.

4. A communication system that sends and receives signals via two adjacent channels in which interchannel interference exists, comprising:
   a transmitter device that transmits data of one unit in a plurality of bits via each channel;
   a receiver device provided in each channel that generates a soft decision target value for each of a plurality of received bits inputted from the corresponding channel and makes a soft decision with respect to the plurality of received bits by using the respective soft decision target values; and
   means for inputting the soft decision target values of the plurality of received bits of the receiver device of one channel to the receiver device of the other channel,
   wherein the receiver device adjusts the respective soft decision target values of its own channel by using the respective soft decision target values of the plurality of bits inputted from the receiver device of the other channel and makes a decision with respect to the received bits on the basis of the soft decision target values,
   wherein, in a case where the data of one unit is two-bit data of an in-phase component or quadrature component that has been obtained by multi-value QAM modulation, the receiver portion of the first bit of the channel of interest of the receiver device comprises:
   two first and second correlation means that integrate the multiplication result obtained by multiplying an input signal by predetermined reference signals;
   three first to third nonlinear units having a transmission function of an amplitude limiter comprising a linear region;
   a multiplication unit that multiplies the outputs of the non-linear units by weighting functions;
   a synthesizer that generates the soft decision target value of the first bit of the channel of interest by synthesizing each weighted multiplication unit output and the output of the first correlation means;
   an adder circuit that adds the soft decision target values of the first and second bits of the other channel to the output signals from the first and second correlation means respectively and then inputs the addition results to the first and second nonlinear units respectively; and
   an adder circuit that adds the soft decision target value of the second bit of the channel of interest to the output signal from the second correlation means and inputs the addition result to the third nonlinear unit.

5. A communication system that sends and receives signals via two adjacent channels in which interchannel interference exists, comprising:
   a transmitter device that transmits data of one unit in a plurality of bits via each channel;
   a receiver device provided in each channel that generates a soft decision target value for each of a plurality of received bits inputted from the corresponding channel and makes a soft decision with respect to the plurality of received bits by using the respective soft decision target values; and
   means for inputting the soft decision target values of the plurality of received bits of the receiver device of one channel to the receiver device of the other channel, wherein the receiver device adjusts the respective soft decision target values of its own channel by using the respective soft decision target values of the plurality of bits inputted from the receiver device of the other channel and makes a decision with respect to the received bits on the basis of the soft decision target values, wherein, in a case where the data of one unit is two-bit data of an in-phase component or quadrature component that has been obtained by multi-value QAM modulation, the receiver portion of the second bit of the channel of interest of the receiver device comprises:

three first, second and third-correlation means that integrate multiplication results obtained by multiplying an input signal by predetermined reference signals;

three first to third nonlinear units having a transmission function of an amplitude limiter comprising a linear region;

an adder circuit that adds the soft decision target values of the second and first bits of the other channel to the output signals from the second and third correlation means respectively and then inputs the addition results to the first and second nonlinear units respectively;

a calculation unit that multiplies the output signal from the first correlation means by a predetermined value and then adds the multiplication result to the outputs of the first and second nonlinear units; and an adder circuit that adds the soft decision target value of the first bit of the channel of interest to the output of the calculation unit and then inputs the addition result to the third nonlinear unit, wherein the soft decision target value of the second bit of the channel of interest is produced on the basis of the output of the third nonlinear unit.

6. A receiver device of a channel of interest in a communication system that sends and receives signals via two adjacent channels in which interchannel interference exists and a transmitter device transmits data of one unit which is consisted of a plurality of bits constituting an in-phase component that has been obtained by multi-value QAM modulation, from one channel and transmits data of one unit which is consisted of a plurality of bits constituting a quadrature component that has been obtained by the multi-value QAM modulation, from other channel, comprising:

means for generating soft decision target values for each of the plurality of received bits inputted from the channel of interest; and a soft decision unit that makes a soft decision with respect to the plurality of received bits by using the respective soft decision target values, wherein the soft decision target value generating means adjust their own soft decision target values by using the respective soft decision target values of the plurality of bits inputted from the receiver device of the other channel and the soft decision unit makes a decision with respect to the received bits on the basis of the soft decision target values.

7. The receiver device according to claim 6, wherein the soft decision target value generating means comprise:

a soft decision target value generation unit corresponding with each of a plurality of received bits that generates soft decision target values that correspond with the received bits.

8. A receiver device of a channel of interest in a communication system that sends and receives signals via two adjacent channels in which interchannel interference exists and a transmitter device transmits data of one unit which is consisted of a plurality of bits constituting an in-phase component that has been obtained by multi-value QAM modulation, from one channel and transmits data of one unit which is consisted of a plurality of bits constituting a quadrature component that has been obtained by the multi-value QAM modulation, from other channel, comprising:

a soft decision target value generation unit provided in correspondence with each of the plurality of received bits that generates soft decision target values that correspond with each of the received bits; and a soft decision unit that makes a soft decision with respect to the plurality of received bits by using the respective soft decision target values, wherein the soft decision target value generation unit comprises:

means for adjusting the soft decision target value of bits of interest by using soft decision target values that are inputted from the receiver device of the other channel; and means for adjusting the soft decision target values of the bits of interest by using soft decision target values of the other bits excluding the bits of interest.

9. The receiver device according to claim 6, wherein the data of one unit is constituted by a plurality of bits constituting an in-phase component that has been obtained by multi-value QAM modulation.

10. The receiver device according to claim 6, wherein the data of one unit is constituted by a plurality of bits constituting a quadrature component that has been obtained by multi-value QAM modulation.

11. A receiver device of a channel of interest in a communication system that sends and receives data of one unit in a plurality of bits via each of two adjacent channels in which interchannel interference exists, comprising:

means for generating soft decision target values for each of the plurality of received bits inputted from the channel of interest; and a soft decision unit that makes a soft decision with respect to the plurality of received bits by using the respective soft decision target values, wherein the soft decision target value generating means adjust their own soft decision target values by using the respective soft decision target values of the plurality of bits inputted from the receiver device of the other channel and the soft decision unit makes a decision with respect to the received bits on the basis of the soft decision target values, wherein the soft decision target value generating means comprise:

a soft decision target value generation unit corresponding with each of a plurality of received bits that generates soft decision target values that correspond with the received bits, and wherein, in a case where the data of one unit is two-bit data of an in-phase component or quadrature component that has been obtained by multi-value QAM modulation, the soft decision target value generation unit of the first bit comprises:

two first and second correlation means that integrate the multiplication results obtained by multiplying an input signal by predetermined reference signals;

three first to third nonlinear units having a transmission function of an amplitude limiter comprising a linear region;

a multiplication unit that multiplies the outputs of the nonlinear units by weighting functions;

a synthesizer that generates the soft decision target value of the first bit of the channel of interest by synthesizing each weighted multiplication unit output and the output of the first correlation means;

an adder circuit that adds the soft decision target values of the first and second bits of the other channel to the output signals from the first and second correlation means respectively and then inputs the addition results to the first and second nonlinear units respectively; and an adder circuit that adds the soft decision target value of the second bit of the channel of interest to the output signal from the second correlation means and inputs the addition result to the third nonlinear unit.

12. A receiver device of a channel of interest in a communication system that sends and receives data of one unit in a plurality of bits via each of two adjacent channels in which interchannel interference exists, comprising:

means for generating soft decision target values for each of the plurality of received bits inputted from the channel of interest; and a soft decision unit that makes a soft decision with respect to the plurality of received bits by using the respective soft decision target values, wherein the soft decision target value generating means adjust their own soft decision target values by using the respective soft decision target values of the plurality of bits inputted from the receiver device of the other channel and the soft decision unit makes a decision with respect to the received bits on the basis of the soft decision target values, wherein the soft decision target value generating means comprise:

a soft decision target value generation unit corresponding with each of a plurality of received bits that generates soft decision target values that correspond with the received bits, and wherein, in a case where the data of one unit is two-bit data of an in-phase component or quadrature component that has been obtained by multi-value QAM modulation, the soft decision target value generation unit of the second bit comprises:

three first, second and third correlation means that integrate the multiplication results obtained by multiplying an input signal by predetermined reference signals;

three first to third nonlinear units having a transmission function of an amplitude limiter comprising a linear region;

an adder circuit that adds the soft decision target values of the second and first bits of the other channel to the output signals from the second and third correlation means respectively and then inputs the addition results to the first and second nonlinear units respectively;

a calculation unit that multiplies the output signal from the first correlation means by a predetermined value and then adds the multiplication result to the outputs of the first and second nonlinear units; and an adder circuit that adds the soft decision target value of the first bit of the channel of interest to the output of the calculation unit and then inputs the addition result to the third nonlinear unit, wherein the soft decision target value of the second bit of the channel of interest is produced on the basis of the output of the third nonlinear unit.

* * * * *